US010809728B2

(12) United States Patent
Chen et al.

(10) Patent No.: US 10,809,728 B2
(45) Date of Patent: Oct. 20, 2020

(54) LANE-CENTRIC ROAD NETWORK MODEL FOR NAVIGATION

(71) Applicant: HERE Global B.V., Eindhoven (NL)

(72) Inventors: Bin Chen, Carlsbad, CA (US); David Doria, Oak Park, IL (US); Hank Sutton, Encinitas, CA (US); Ian Endres, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 249 days.

(21) Appl. No.: 15/705,750

(22) Filed: Sep. 15, 2017

(65) Prior Publication Data
US 2019/0086928 A1   Mar. 21, 2019

(51) Int. Cl.
G05D 1/02 (2020.01)
G06F 16/29 (2019.01)
G01C 21/32 (2006.01)
G08G 1/16 (2006.01)
(Continued)

(52) U.S. Cl.
CPC .......... G05D 1/0214 (2013.01); G01C 21/32 (2013.01); G01C 21/3492 (2013.01); G01C 21/3602 (2013.01); G05D 1/0212 (2013.01); G05D 1/0231 (2013.01); G05D 1/0274 (2013.01);
(Continued)

(58) Field of Classification Search
None
See application file for complete search history.

(56) References Cited

U.S. PATENT DOCUMENTS

| 6,269,305 B1 * | 7/2001 | Yamashita ......... G01C 21/3658 701/533 |
| 9,435,885 B2 | 9/2016 | Fritsch et al. |
| 9,494,434 B2 | 11/2016 | Weiland et al. |

(Continued)

FOREIGN PATENT DOCUMENTS

| EP | 1498694 A2 | 1/2005 |
| JP | 2006/266865 A | 10/2006 |
| JP | 2010-026875 A | 2/2010 |

OTHER PUBLICATIONS

Dupuis, Marius, OpenDRIVE® Format Specification, Rev. 1.4, VIRES Simulationstechnologie GmbH, Nov. 4, 2014, 103 pages, Germany.

(Continued)

Primary Examiner — Jonathan M Dager
Assistant Examiner — Garrett F Evans
(74) Attorney, Agent, or Firm — Alston & Bird LLP

(57) ABSTRACT

A geographic database storing map data is provided. The geographic database is stored in a non-transitory computer readable medium. The geographic database comprises a plurality of records corresponding to drivable surfaces of a road network. The plurality of records comprise a plurality of lane records corresponding to particular lanes of the road network. Each first record of the plurality of records comprises a plurality of instances of adjacency information. Each instance of adjacency information/data (a) links the first record corresponding to a first drivable surface of the road network to a second record of the plurality of records corresponding to a second drivable surface of the road network. The first drivable surface is adjacent to the second drivable surface. Each instance of adjacency information/data indicates crossing parameters between the first drivable surface and the second drivable surface.

20 Claims, 13 Drawing Sheets

(51) Int. Cl.
*G01C 21/34* (2006.01)
*G01C 21/36* (2006.01)

(52) U.S. Cl.
CPC .............. *G06F 16/29* (2019.01); *G08G 1/167* (2013.01); *G05D 2201/0213* (2013.01)

(56) References Cited

U.S. PATENT DOCUMENTS

| | | | |
|---|---|---|---|
| 9,494,942 B1 | 11/2016 | Montemerlo et al. | |
| 9,568,916 B2 | 2/2017 | Pollock | |
| 2003/0023614 A1 | 1/2003 | Newstrom et al. | |
| 2013/0282264 A1* | 10/2013 | Bastiaensen | G08G 1/0129 701/119 |
| 2015/0316386 A1* | 11/2015 | Delp | G01C 21/3658 701/532 |
| 2016/0257307 A1 | 9/2016 | Delp | |
| 2017/0192436 A1* | 7/2017 | Min | G05D 1/0276 |
| 2018/0189578 A1* | 7/2018 | Yang | G01C 21/3638 |

OTHER PUBLICATIONS

Willemsen, Peter Jason, "Behavior and Scenario Modeling for Real-time Virtual Environments", Thesis for the University of Iowa, May 2000, 57 pages, retrieved from <https://pdfs.semanticscholar.org/le3e/90c67552694ee324747a7eeba8f7b53817ac.pdf> on Dec. 11, 2017.

European Patent Office, Extended European Search Report for Application No. 18194337.4, dated Feb. 1, 2019, 9 pages, Germany.

Fohl, Peter, et al., "A Non-Planar, Lane-Based Navigable Data Model for ITS", Proceedings of the International Symposium on Spatial Data Handling, XX, Aug. 1, 1996, pp. 7B.17-7B.29, XP002428165.

* cited by examiner

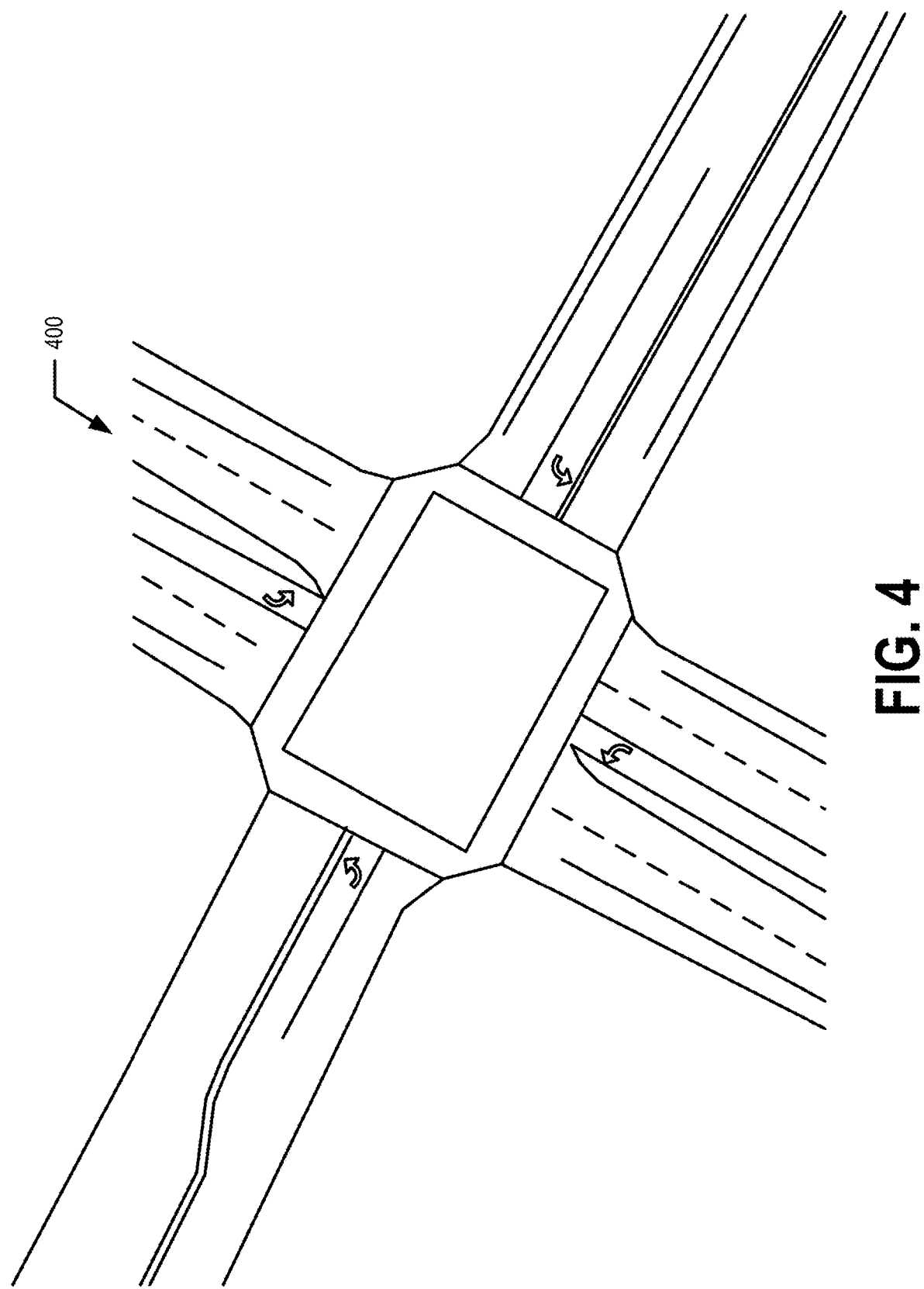

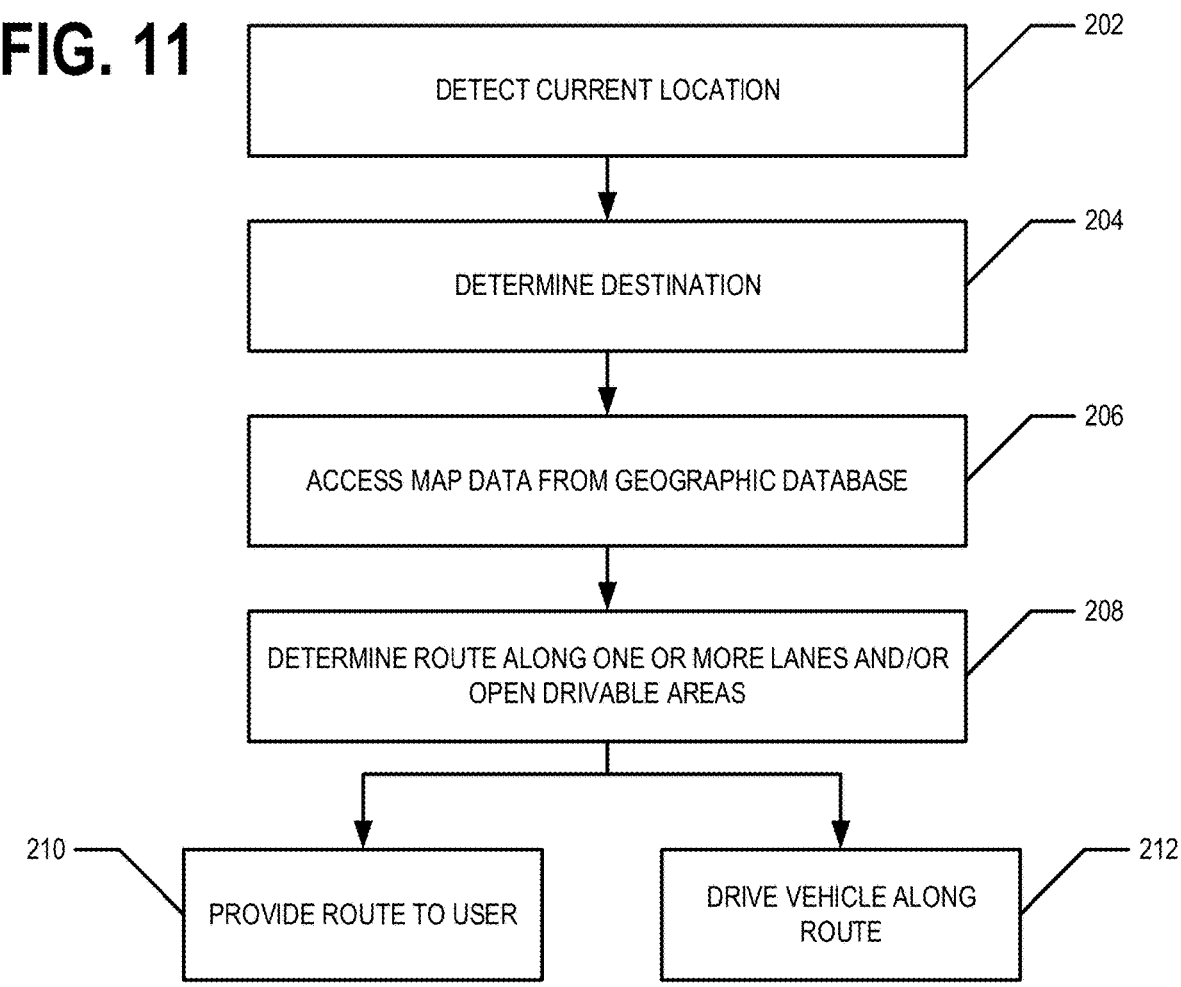

LANE-CENTRIC ROAD NETWORK MODEL FOR NAVIGATION

TECHNOLOGICAL FIELD

An example embodiment relates generally to a road network model for use in navigating the road network. In particular, an example embodiment generally relates to a lane-centric road network model and uses of the lane-centric road network model for navigation of the road network.

BACKGROUND

Generally road network models describe road segments as abstract objects. An abstract object may be assigned a collection of lanes. However, the collection of lanes are not described by the physical boundaries of the lanes. These road segment-based models lack the ability to accurately describe complex roads having non-trivial lane level topologies. For example, the road segment-based models cannot accurately describe intersections in which the stop line for a left turn lane is not aligned with the stop line for an adjacent forward or right turn lane.

Autonomous driving requires high accuracy road network models that accurately describe lane topology. Continuing the example of the left turn lane from above, if an autonomous vehicle is in the left turn lane, the vehicle will need to know the location of the stop line for the left turn lane rather than a virtual location of a virtual amalgamate stop line configured to represent the stop line for entire road segment. Thus, a road network model to be used for navigation of an autonomously driven vehicle should be able to accurately describe road segments having non-trivial topologies.

BRIEF SUMMARY

An example embodiment provides a lane-centric model of a road network that accurately describes individual lanes of the physical road network. In an example embodiment, a road network may comprise a plurality of surfaces. The plurality of surfaces comprise non-drivable surfaces (e.g., parking spaces, gore, shoulder, and/or the like) and drivable surfaces (e.g., lanes and open drivable surfaces). The drivable surfaces of the road network may comprise and/or be divided into lanes and open drivable surfaces. In an example embodiment, each lane of the road network corresponds to a lane record within the lane-centric road network model. For example, each lane may be described by one or more longitudinal boundary elements and one or more lateral boundary elements. The lateral boundary elements may describe the location of the boundaries of the lane in a direction that does not cross the flow of traffic of the lane. The longitudinal boundary elements may describe the location of the boundaries of the lane in a direction that does cross the flow of traffic of the lane. Lanes that are physically adjacent to one another may be linked via adjacency information/data that may comprise crossing parameters indicating under what circumstances, if any, a vehicle can cross from a first drivable surface to an adjacent second drivable surface. In an example embodiment, a first lane and second lane are adjacent if they share at least one of a lateral boundary element or a longitudinal boundary element. The lane-centric model of the road network may further comprise one or more open drivable surface records. Each open drivable surface record corresponds to an open drivable surface of the road network. An open drivable surface is an area of road surface within the road network where road topology changes or becomes unstable. For example, an open drivable surface may be an area of road surface within the road network wherein two or more lanes overlap, at least in part, possibly due to changes in lane level topology. For example, an open drivable surface may be an area where lanes join or split. In another example, an intersection may be an open drivable surface because two or more lanes cross, share space, and/or the like in the intersection. Example embodiments also provide methods and apparatuses for navigating using the lane-centric model of the road network. A legal and collision free driving corridor may be determined by linking drivable surfaces of the road network (e.g., lanes and/or open drivable surfaces) based on the corresponding instances of adjacency information/data. The driving corridor may be used by a vehicle apparatus to plan a drive path through the road network.

According to an example embodiment, a memory of an apparatus stores a geographic database. The geographic database comprises a plurality of records corresponding to drivable surfaces of a road network. The plurality of records comprises a plurality of lane records, wherein each lane record corresponds to a particular lane of the road network drivable surface. Each first record of the plurality of records comprises a plurality of instances of adjacency information. Each instance of adjacency information/data (a) links the first record corresponding to a first drivable surface of the road network to a second record of the plurality of records corresponding to a second drivable surface of the road network. The first drivable surface is adjacent to the second drivable surface. Each instance of adjacency information/data indicates crossing parameters between the first drivable surface and the second drivable surface. A start location and a destination location are determined. Map data stored in the geographic database is accessed. A driving corridor is determined from the start location to the destination location by linking one or more data records of the plurality of data records based on the corresponding instances of adjacency information/data of the plurality of instances of adjacency information.

According to an aspect of the present invention, an apparatus is provided. In an example embodiment, the apparatus comprises at least one memory, the at least one memory storing a geographic database storing map data. The geographic database comprises a plurality of records corresponding to drivable surfaces of a road network. The plurality of records comprises a plurality of lane records, wherein each lane record corresponds to a particular lane of the road network. Each first record of the plurality of records comprises a plurality of instances of adjacency information. Each instance of adjacency information/data (a) links the first record corresponding to a first drivable surface of the road network to a second record of the plurality of records corresponding to a second drivable surface of the road network. The first drivable surface is adjacent to the second drivable surface. Each instance of adjacency information/data indicates crossing parameters between the first drivable surface and the second drivable surface. The apparatus further comprises at least one processor. The processor is configured to determine a start location and a destination location; access map data stored in the geographic database; and determine a driving corridor from the start location to the destination location by linking one or more lane records of the plurality of lane records and one or more open drivable surface records of the plurality of open drivable surface records based on the corresponding instances of adjacency information/data of the plurality of instances of adjacency information.

In an example embodiment, the apparatus further comprises a user interface and the processor is further configured to cause the user interface to display the driving corridor on a visualization of the one or more lane records and one or more open drivable surface records. In an example embodiment, the processor is further configured to control one or more mechanical systems of a vehicle to as the vehicle to traverses at least a portion of the route. In an example embodiment, the apparatus further comprises a user interface, the processor further configured to cause the user interface to provide an alert based on traffic information corresponding to at least one of the one or more lane records or one or more open drivable surface records. In an example embodiment, each lane record comprises one or more lateral boundary elements and one or more longitudinal boundary elements, wherein a lateral boundary element does not cross a flow of traffic along a corresponding lane of the road network and a longitudinal boundary element does cross the flow of traffic along the corresponding lane. In an example embodiment, the first drivable surface and the second drivable surface have a shared boundary element, the shared boundary element being at least one of (a) a lateral boundary element or (b) a longitudinal boundary element. In an example embodiment, the crossing parameters indicate whether the shared boundary element is not crossable, crossable in a first direction, crossable in a second direction that is opposite the first direction, or crossable in both the first direction and the second direction. In an example embodiment, (a) a first lateral boundary element of the one or more lateral boundary elements identifies a physical location of a lateral boundary of the corresponding lane and (b) a first longitudinal boundary element of the one or more longitudinal boundary elements identifies a physical location of a longitudinal boundary of the corresponding lane. In an example embodiment, the first record comprises one or more features corresponding to the first drivable surface. In an example embodiment, the one or more features comprises at least one of a lane identifier, a segment identifier, a segment name, an open drivable surface identifier, an intersection identifier, a speed limit, one or more traffic rules, or one or more traffic conditions corresponding to the first drivable surface. In an example embodiment, a first lane record of the plurality of lane records comprises at least one of lane geometry information, a lane center line, or interior lane boundaries. In an example embodiment, the plurality of data records comprises one or more open drivable surface records, each open drivable surface record corresponds to a drivable surface of the road network wherein two or more lanes overlap at least in part.

According to an aspect of the present invention, a geographic database storing map data is provided. The geographic database is stored in a non-transitory computer readable medium and comprises a plurality of records corresponding to drivable surfaces of a road network. The plurality of records comprises a plurality of lane records, wherein each lane record corresponds to a particular lane of the road network. The open drivable surface corresponds to one or more lanes of the road network. Each first record of the plurality of records comprises a plurality of instances of adjacency information. Each instance of adjacency information/data (a) links the first record corresponding to a first drivable surface of the road network to a second record of the plurality of records corresponding to a second drivable surface of the road network, wherein the first drivable surface is adjacent to the second drivable surface and (b) indicates crossing parameters for crossing a shared boundary of the first drivable surface and the second drivable surface.

In an example embodiment, each lane record comprises one or more lateral boundary elements and one or more longitudinal boundary elements, a lateral boundary element not crossing a flow of traffic along a corresponding lane of the road network and a longitudinal boundary element crossing the flow of traffic along the corresponding lane. In an example embodiment, the first drivable surface and the second drivable surface have a shared boundary element. The shared boundary element is at least one of (a) a lateral boundary element or (b) a longitudinal boundary element. In an example embodiment, the crossing parameters indicate whether the shared boundary element is not crossable, crossable in a first direction, crossable in a second direction that is opposite the first direction, or crossable in both the first direction and the second direction. In an example embodiment, (a) a first lateral boundary element of the one or more lateral boundary elements identifies a physical location of a lateral boundary of the corresponding lane and (b) a first longitudinal boundary element of the one or more longitudinal boundary elements identifies a physical location of a longitudinal boundary of the corresponding lane. In an example embodiment, a first lane record of the plurality of lane records indicates that a lateral boundary is not shared with any other drivable surface of the road network, the first lane record indicates that the lateral boundary is not crossable. In an example embodiment, the first record comprises one or more features corresponding to the first drivable surface. In an example embodiment, the one or more features comprises at least one of a lane identifier, a segment identifier, a segment name, an open drivable surface identifier, an intersection identifier, a speed limit, one or more traffic rules, or one or more traffic conditions corresponding to the first drivable surface. In an example embodiment, a first lane record of the plurality of lane records comprises at least one of lane geometry information, a lane center line, or interior lane boundaries. In an example embodiment, the plurality of data records comprises one or more open drivable surface records, each open drivable surface record corresponds to a drivable surface of the road network wherein two or more lanes overlap at least in part.

In accordance with yet another example embodiment of the present invention, an apparatus is provided that comprises means for storing a geographic database storing map data. The geographic database comprises a plurality of records corresponding to drivable surfaces of a road network. The plurality of records comprises a plurality of lane records, wherein each lane record corresponds to a particular lane of the road network. Each first record of the plurality of records comprises a plurality of instances of adjacency information. Each instance of adjacency information/data (a) links the first record corresponding to a first drivable surface of the road network to a second record of the plurality of records corresponding to a second drivable surface of the road network. The first drivable surface is adjacent to the second drivable surface. Each instance of adjacency information/data indicates crossing parameters between the first drivable surface and the second drivable surface. The apparatus comprises means for determining a start location and a destination location. The apparatus comprises means for accessing map data stored in the geographic database. The apparatus comprises means for determining a driving corridor from the start location to the destination location by linking one or more data records of the plurality of data records based on the corresponding instances of adjacency information/data of the plurality of instances of adjacency information.

BRIEF DESCRIPTION OF THE DRAWINGS

Figure 1:
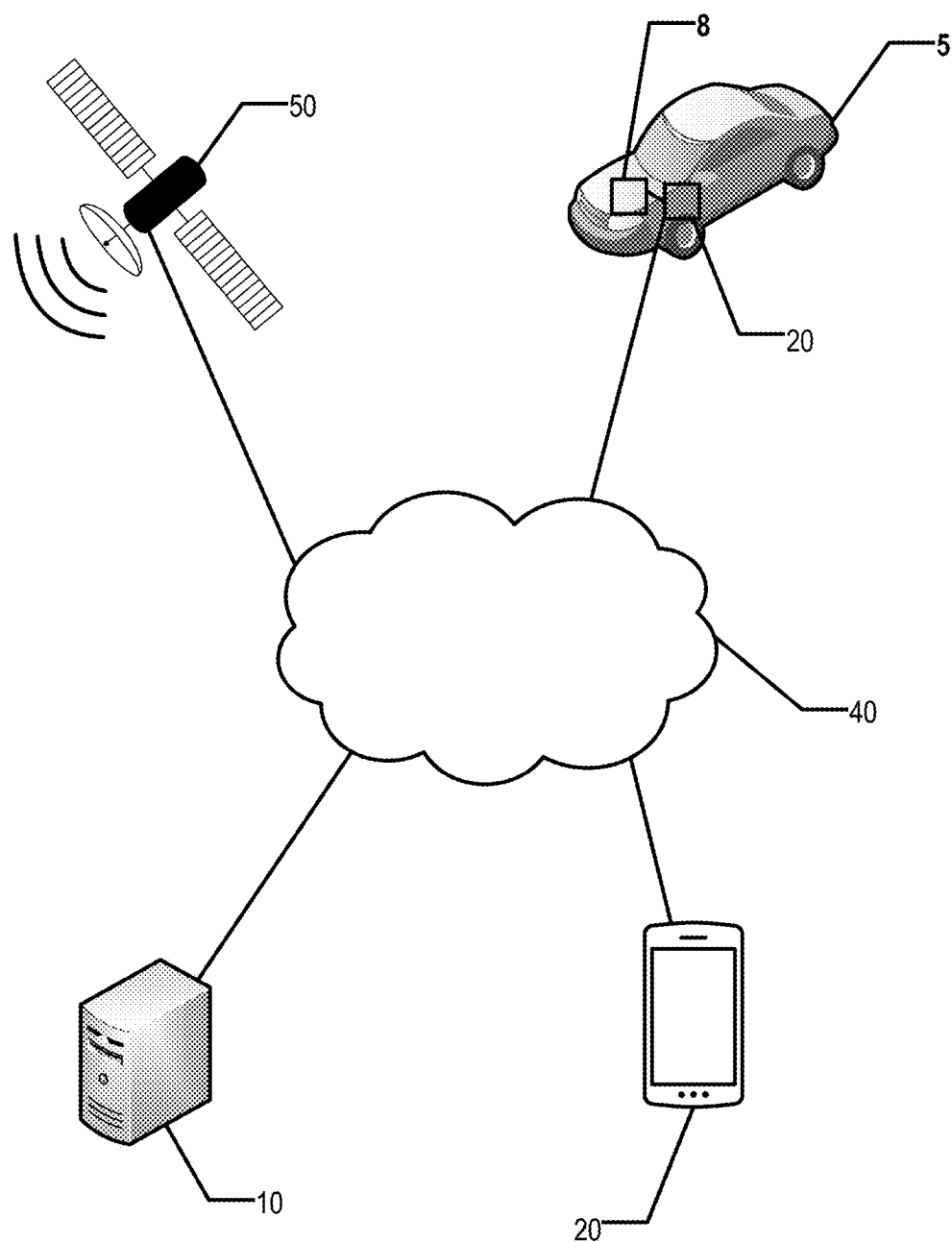
Figure 2A:
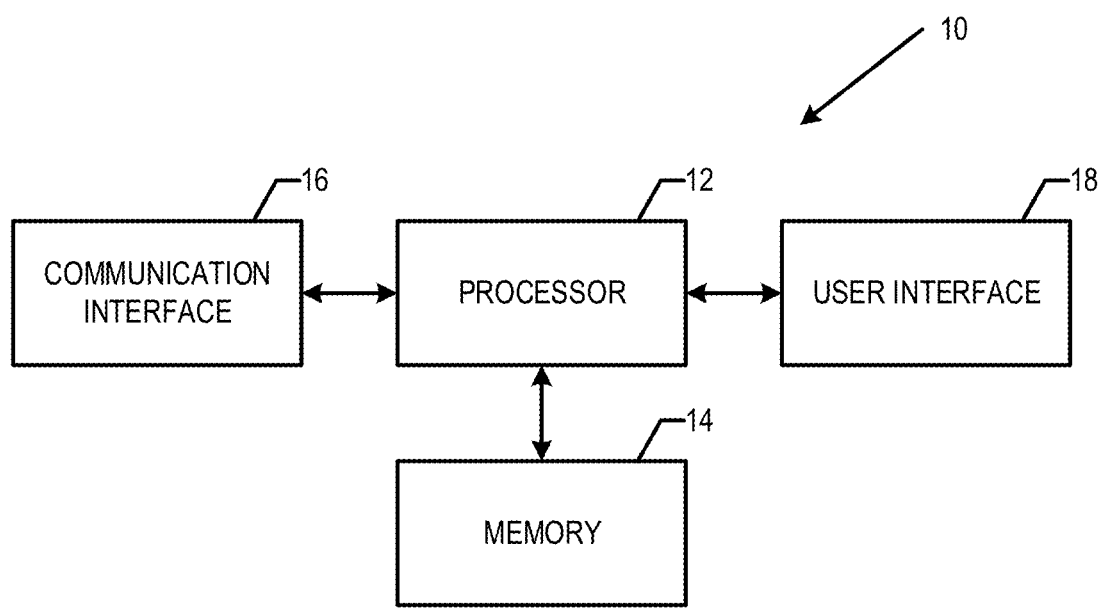
Figure 2B:
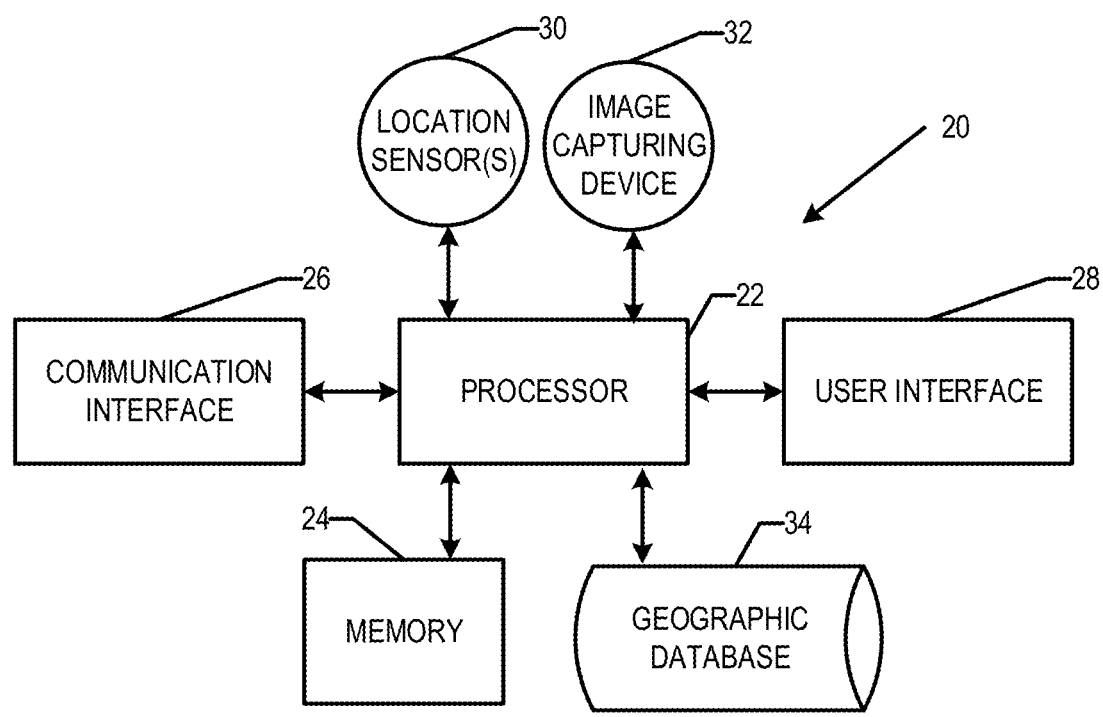
Figure 3A:
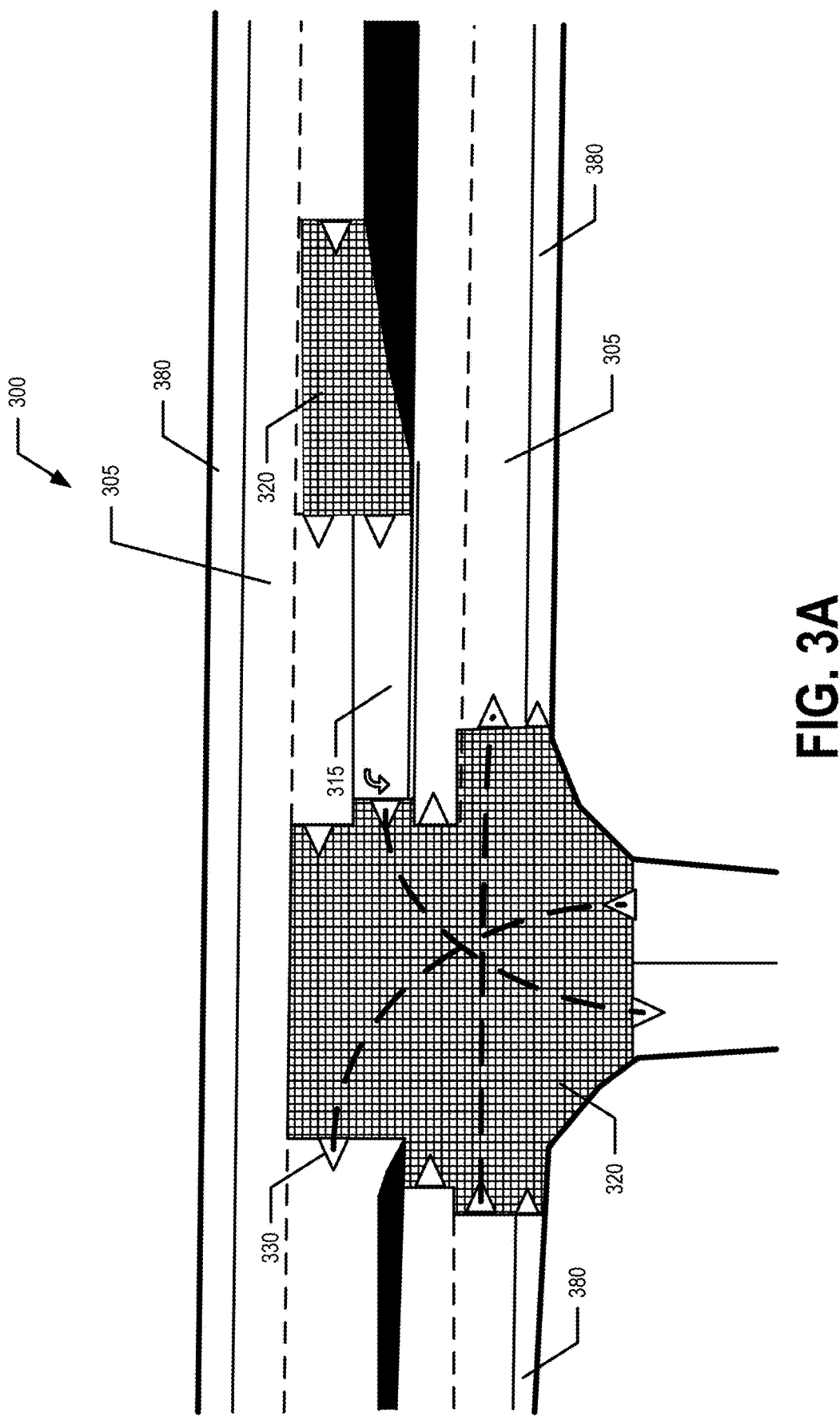
Figure 3B:
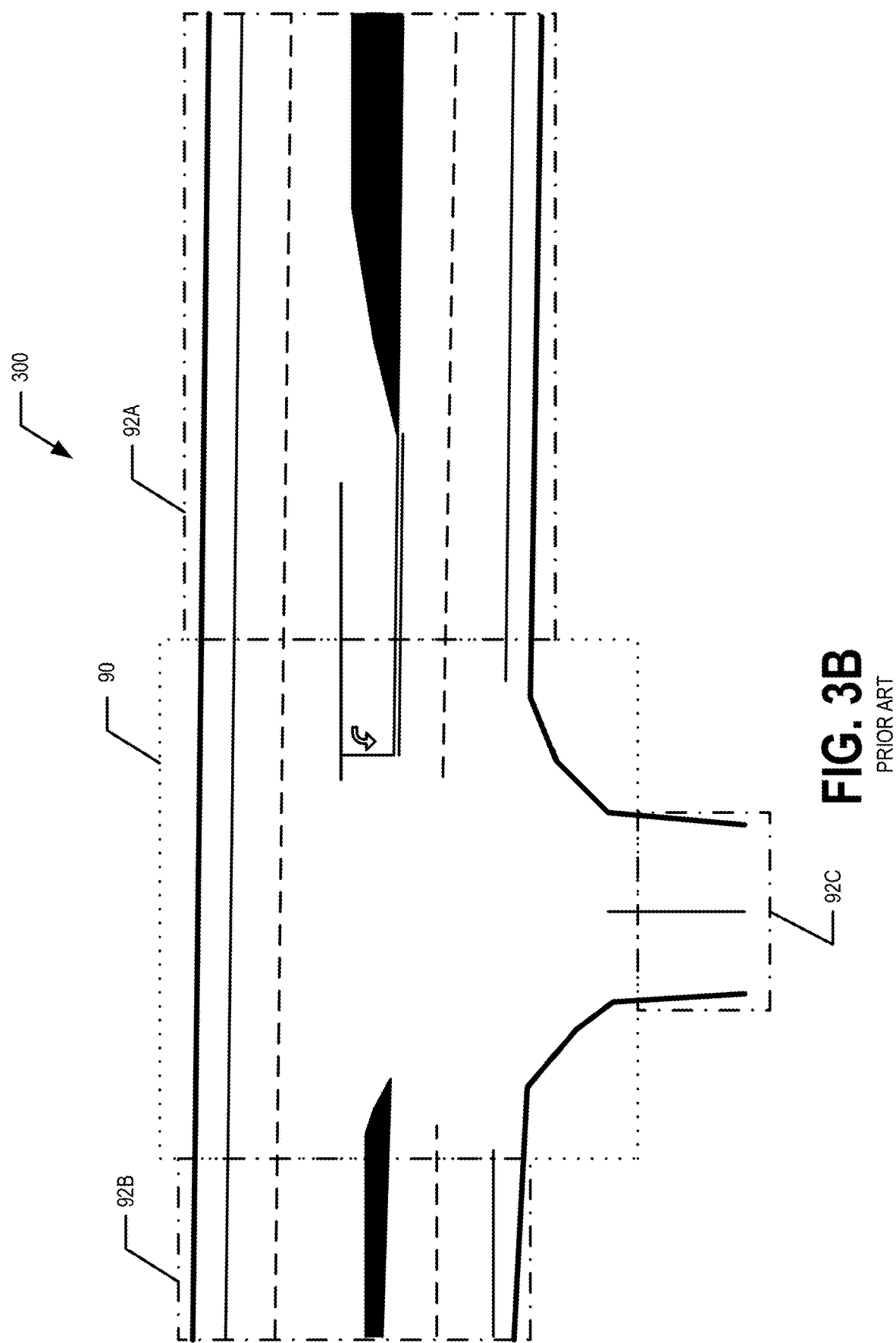
Figure 5:
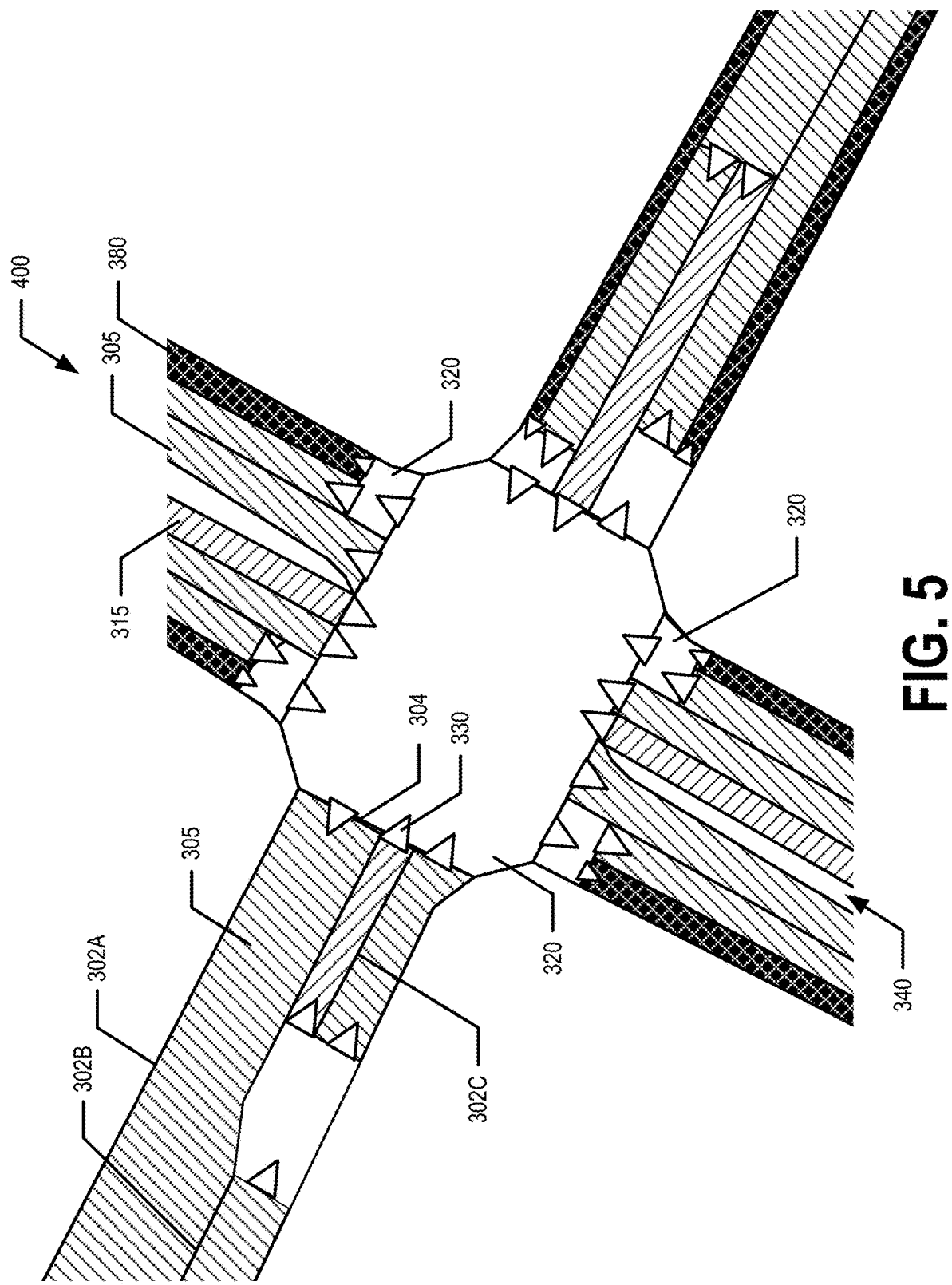
Figure 6:
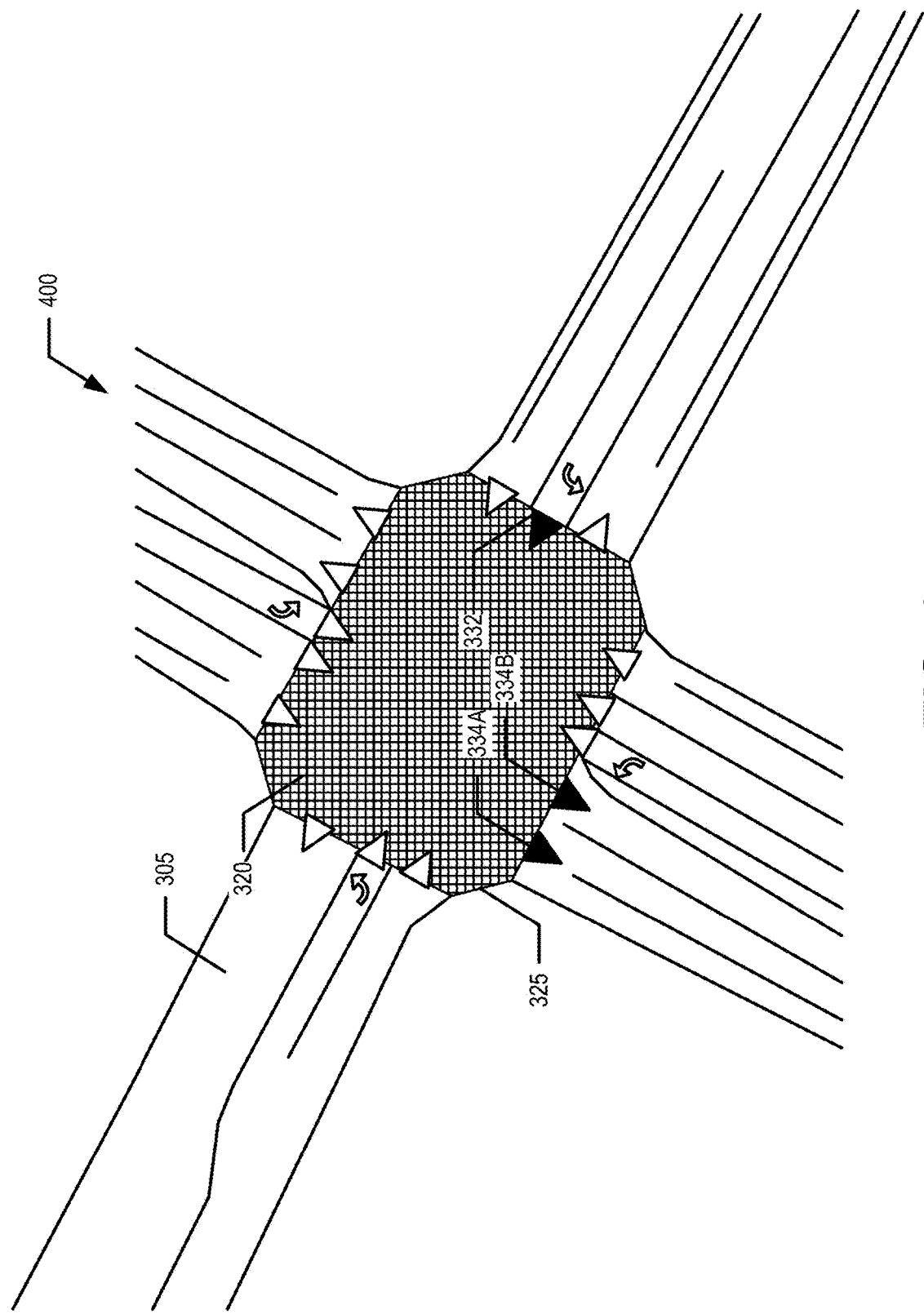
Figure 7:
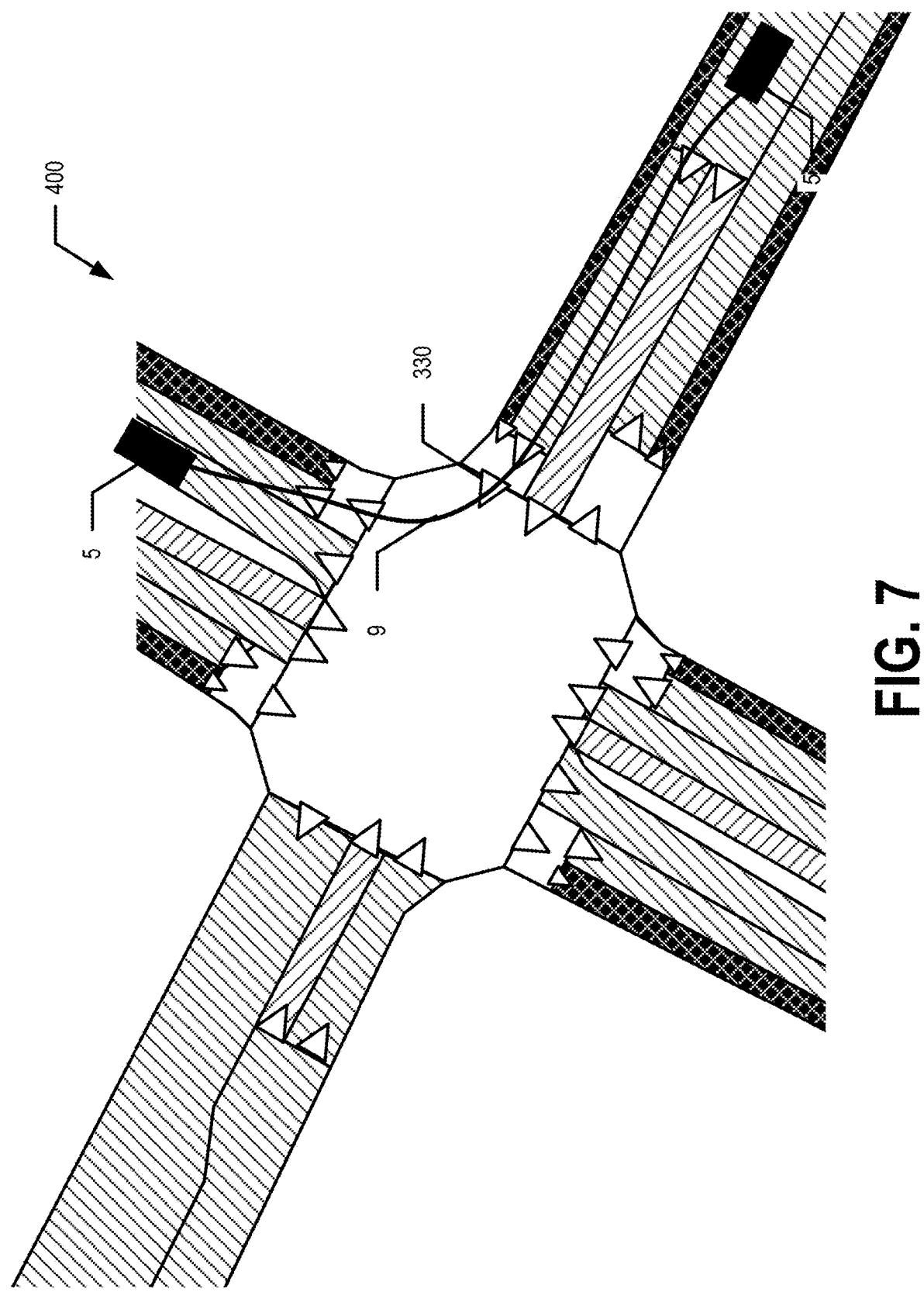
Figure 8:
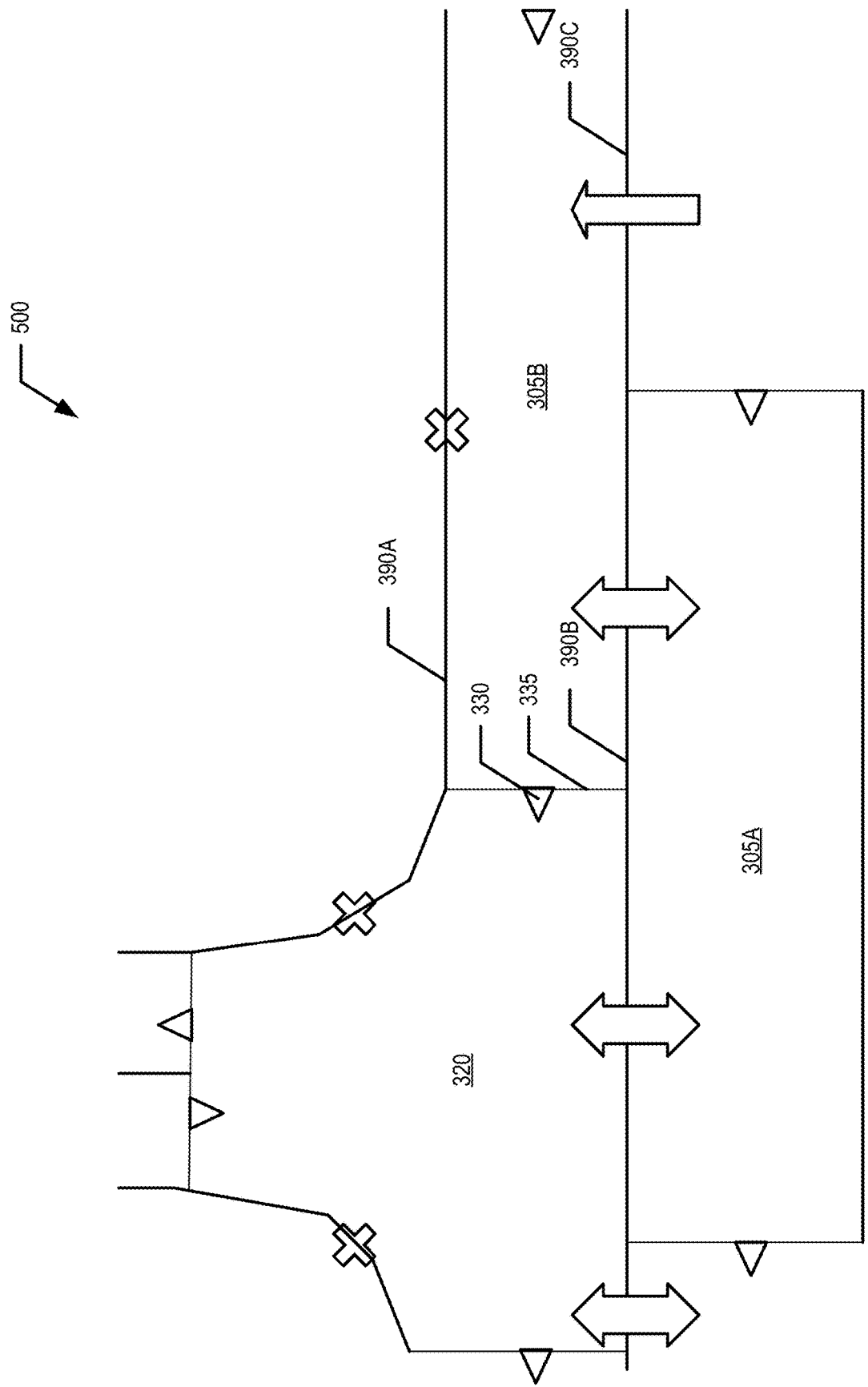
Figure 9:
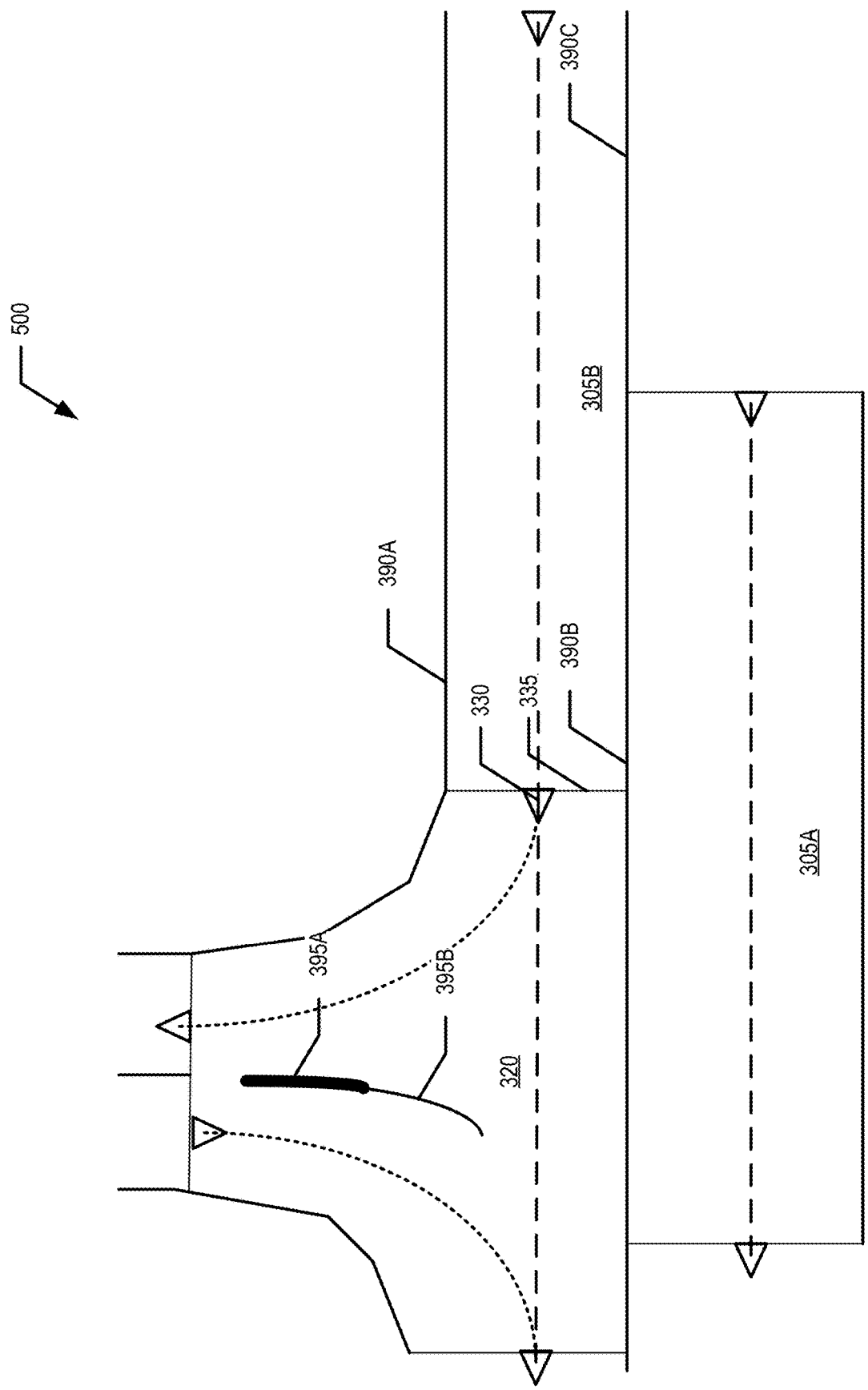
Figure 10:
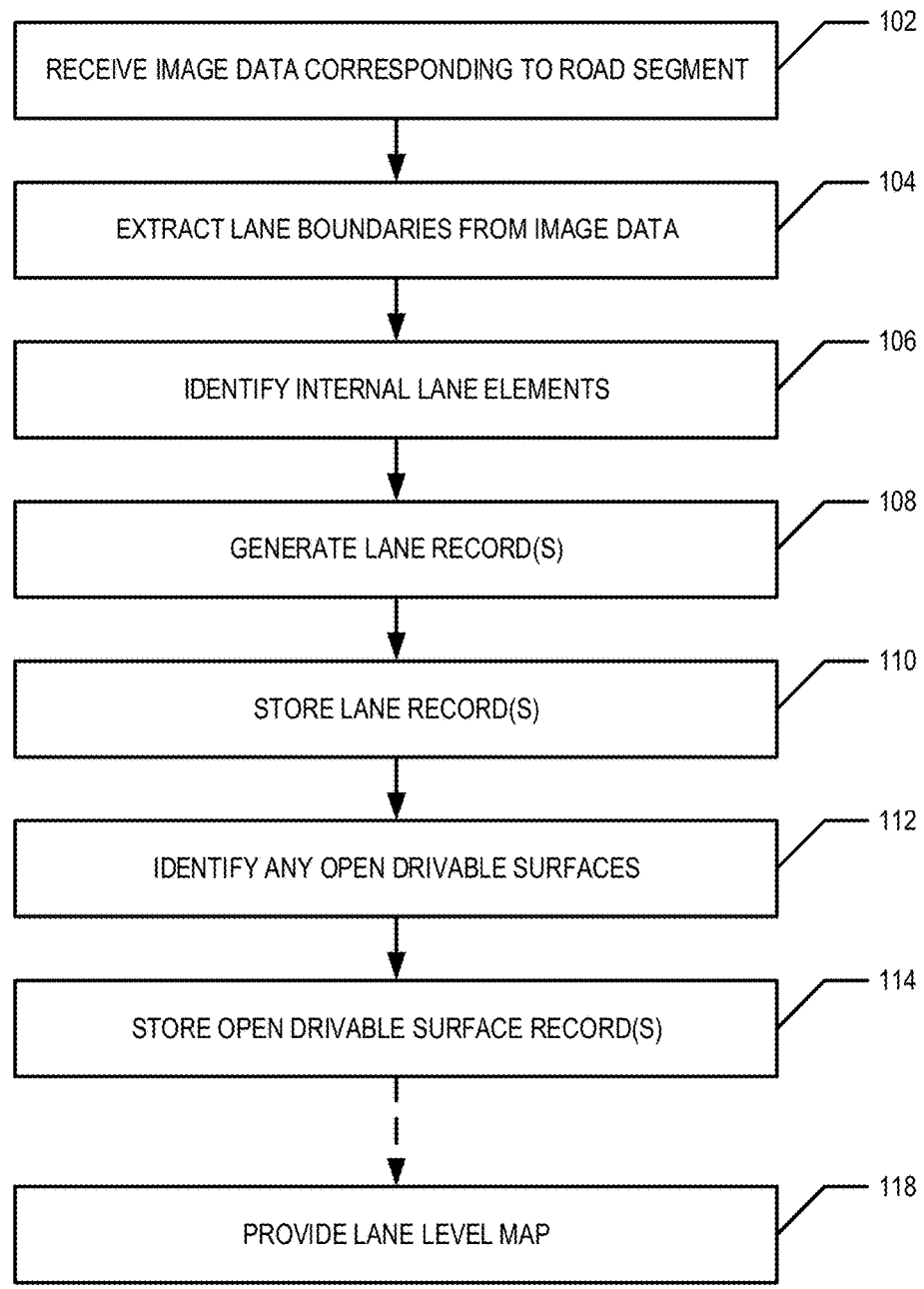

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a model apparatus that may be specifically configured in accordance with an example embodiment;

FIG. 2B is a block diagram of a vehicle apparatus that may be specifically configured in accordance with an example embodiment;

FIG. 3A is a diagram illustrating a representation of another intersection and adjacent road segments according to an example embodiment of the lane-centric road network model;

FIG. 3B is a diagram illustrating a prior art representation of the intersection and adjacent road segments shown in FIG. 3A;

FIG. 4 is a diagram illustrating an example intersection and adjacent road segments;

FIG. 5 is a diagram illustrating the lanes and open drivable surfaces of the intersection shown in FIG. 4 as represented by an example embodiment of the lane-centric road network model;

FIG. 6 is a diagram illustrating the open drivable surface of the intersection shown in FIG. 4 as represented by an example embodiment of the lane-centric road network model;

FIG. 7 is a diagram illustrating an example of navigating through the intersection shown in FIG. 4 using an example embodiment of the lane-centric road network model;

FIG. 8 is a diagram illustrating various inter-drivable surface components of a data record of an example embodiment of the lane-centric road network model;

FIG. 9 is a diagram illustrating various intra-drivable surface components of a data record of an example embodiment of the lane-centric road network model;

FIG. 10 is flowchart illustrating operations performed, such as by the model apparatus of FIG. 2A to generate and/or update a lane-centric road network model, in accordance with an example embodiment; and FIG. 11 is a flowchart illustrating operations performed, such as by the vehicle apparatus of FIG. 2B, to use a lane-centric road network model to navigate, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Example embodiments provide a geographic database comprising map data of a lane-centric road network model. Example embodiments further provide methods, apparatus and computer program products for generating and/or updating a geographic database comprising map data of a lane-centric network model and/or navigating using a geographic database comprising map data of a lane-centric network model. In an example lane-centric road network model, a road network comprises drivable surfaces and non-drivable surfaces. The non-drivable surfaces comprise parking spaces, gore, shoulders, and/or the like. The drivable surfaces of a road network are divided into lanes and open drivable surfaces. In an example embodiment, the drivable surfaces of the lane-centric network model correspond to surfaces of the road network that may be legally driven on. A lane is a travel lane of a road segment. An open drivable surface is a drivable surface of the road network which is not dedicated to a single lane. For example, an open drivable surface may be an area of road surface within the road network wherein two or more lanes overlap, at least in part, possibly due to changes in lane level topology. For example, an open drivable surface corresponds to two or more lanes or fuzzy lanes of the road network. For example, two or more lanes may cross, share space, and/or the like within an open drivable surface. An example of an open drivable surface is the "box" of an intersection.

The geographic database comprising map data of a lane-centric road network model of an example embodiment comprises a plurality of data records. The plurality of data records comprise lane records, open drivable surface records, and non-drivable surface records. Each lane record corresponds to a lane of the road network, each open drivable surface record corresponds to an open drivable surface of the road network, and each non-drivable surface record corresponds to a non-drivable surface of the road network. Each data record comprises inter-surface elements and intra-surface elements. The inter-surface elements comprise boundary elements defining the perimeter, boundary, and/or edges of the corresponding drivable or non-drivable surface. The inter-surface elements of a lane record comprise longitudinal and lateral boundary elements and instances of adjacency information/data. Lateral boundary elements describe the physical location of the lateral boundaries of a lane in a direction that is generally along or parallel to the flow of traffic of the lane. For example, a lateral boundary of a lane does not cross the flow of traffic of the lane. Longitudinal boundary elements describe the physical location of the longitudinal boundaries of a lane in a direction that is generally across the flow of traffic of the lane. For example, a longitudinal boundary of a lane does cross the flow of traffic of the lane. An instance of adjacency information/data links a first surface of the road network and a second surface of the road network. For example, the adjacency information/data may indicate the connectivity of the various surfaces of the road network. In particular, the first surface and the second surface have a shared boundary. For example, a first data record corresponding to the first drivable surface and a second data record corresponding to the second drivable surface share at least one boundary element. For example, both the first data record and the second data record comprise a first boundary element corresponding to a shared boundary. The instance of adjacency information/data comprises crossing parameters for the first and second surfaces. For example, the crossing parameters may indicate when, where, and under what conditions a vehicle may pass from the first surface to the second surface. For example, if the first surface and the second surface are adjacent lanes that share a lateral boundary, the crossing parameters may correspond to changing lanes between the first surface and the second surface. For example, if the first surface and the second surface are adjacent lanes that share a longitudinal boundary, the crossing parameters may correspond to continuing along the travel lane corresponding to the first surface and the second surface. In another example, if the first surface is a lane and the second surface is an open drivable surface, the crossing parameters may indicate whether the open drivable surface is an intersection and if so what type of intersection (e.g., traffic light, stop sign, etc.), if vehicles entering the second surface from the first surface have the right of way over other vehicles entering the open drivable surface, and/or the like. For example, a longitudinal boundary element may be located at and/or indicate the location of the stop line painted on the road surface. The stop line may be linked to a traffic control unit, such as a traffic light, stop sign, yield sign, text on the road surface, and/or the like. For example, if the first surface is a drivable surface and the second surface is a non-drivable surface, the crossing parameters may indicate the situations under which a vehicle traveling the first surface may cross into the second surface. The intra-surface elements comprise lane geometry information, a lane center line, interior lane boundaries, and/or the like.

In an example embodiment, the map data of the lane-centric road network model may be generated, updated, managed, and/or the like by a model apparatus 10. For example, the model apparatus 10 may store a geographic database storing map data of the lane-centric road network model. In an example embodiment, the map data of the lane-centric network model may be generated, updated, managed, and/or the like based on image data captured by one or more image capture systems 50, one or more vehicle apparatuses 20, and/or the like. In an example embodiment, the geographic database comprising map data of the lane-centric network model may be stored, updated, managed, and/or the like as a tiled map.

For example, the lane-centric network model may be provided as a layer in a map tile of digital map, and/or the like. For example, a digital map may be tiled such that map information/data (e.g., the data records of the lane-centric road network model) may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population or feature density within the map region, and/or the like. For example, data records of the map data of the lane-centric road network model may be stored in association with, linked to, and/or as a layer or the like of a map tile within which the corresponding drivable surface is located. Thus, the geographic database comprising map data of the lane-centric road network model may be easily provided to one or more vehicle apparatuses 20 with a map update (e.g., one or more updated map tiles) and/or efficiently accessed by a vehicle apparatus 20 to perform real time or near real time localization and/or pose determination, driving corridor determination, and/or the like.

The model apparatus 10 may provide (e.g., transmit) the geographic database comprising the map data of the lane-centric road network model (e.g., one or more data records) to one or more vehicle apparatuses 20. A vehicle apparatus 20 may use the geographic database comprising map data of the lane-centric road network model and/or data records thereof to perform one or more navigation functions. For example, the one or more navigation functions may comprise determining a driving corridor from a start location to a destination location, displaying a driving corridor from a start location to a destination location and/or a portion thereof, autonomously driving a vehicle along a driving corridor from a start location to a destination location, assist in driving a vehicle along a driving corridor from a start location to a destination location, providing one or more alerts corresponding to a driving corridor from a start location to a destination location, and/or the like. For example, the vehicle apparatus may control and/or adjust one or more mechanical systems of the vehicle based on the map data of the lane-centric road network model, the current location of the vehicle, and/or the like.

FIG. 1 provides an illustration of an example system that can be used in conjunction with various embodiments of the present invention. As shown in FIG. 1, the system may include one or more vehicle apparatuses 20, one or more model apparatuses 10, one or more networks 40, one or more image capture systems 50, and/or the like. In various embodiments, the vehicle apparatus 20 may be an in vehicle navigation system, vehicle control system, a mobile computing device, and/or the like. For example, a vehicle apparatus 20 may be an in vehicle routing and navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle 5, assist in control of a vehicle 5, and/or the like. For example, the vehicle apparatus 20 may be configured and/or programmed to control and/or adjust one or more mechanical systems 8 of the vehicle 5.

In an example embodiment, a model apparatus 10 may comprise components similar to those shown in the example model apparatus 10 diagrammed in FIG. 2A. In an example embodiment, the model apparatus 10 may be configured to generate, update, and/or manage a lane-centric road network model, map information/data corresponding to a lane-centric road network model, a geographic database comprising map information/data corresponding to a lane-centric road network model, and/or the like. In an example embodiment, the model apparatus 10 is configured to provide map updates, and/or the like to the vehicle apparatus 20. In an example embodiment, a vehicle apparatus 20 may comprise components similar to those shown in the example vehicle apparatus 20 diagrammed in FIG. 2B. In various embodiments, the model apparatus 10 may be located remotely from the vehicle apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. For example, a model apparatus 10 may be in communication with one or more image capture systems 50 and/or one or more vehicle apparatuses 20 via one or more wired or wireless networks 40 so as to receive image data captured thereby and/or to provide map updates to one or more vehicle apparatuses 20. In some embodiments, a network 40 may comprise the automotive cloud, digital transportation infrastructure (DTI), radio data system (RDS)/high definition (HD) radio or other digital radio system, and/or the like. For example, a vehicle apparatus 20 may be in communication with a model apparatus 10 via the network 40. For example, the vehicle apparatus 20 may communicate with the model apparatus 10 via a network, such as the Cloud. For example, the Cloud may be a computer network that provides shared computer processing resources and data to computers and other devices connected thereto. For example, the vehicle apparatus 20 may be configured to receive one or more map tiles of a digital map from the model apparatus 10.

In an example embodiment, as shown in FIG. 2B, the vehicle apparatus 20 may comprise a processor 22, memory 24, a communications interface 26, a user interface 28, one or more location sensors 30 (e.g., a location sensor such as a GPS sensor; IMU sensors, and/or the like), one or more image capturing devices 32 (e.g., camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the vehicle apparatus 20 to determine one or more features of the corresponding vehicle's 5 surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store a geographic database 34 storing map data of the lane-centric road network model. For example, the geographic database 34 may comprise a plurality of data records of the lane-centric road network model. The geographic database 34 may be used by a vehicle apparatus 20 to perform localization, driving corridor determination, real time or near real time navigation, and/or the like as vehicle 5 travels along drivable surfaces of the road network.

Although only one vehicle is shown in FIG. 1, a plurality of similarly equipped vehicles 5 may travel the drivable surfaces of the road network. The vehicle comprises one or more mechanical systems 8 configured to control and/or assist the movement of the vehicle 5 along the drivable surfaces of the road network. For example, the one or more mechanical systems 8 may comprise one or more driver assistance or safety systems. The driver assistance systems are systems that make operation of the vehicle safer or more convenient. The driver assistance systems may include an obstacle warning system, a lane departure warning system, an adaptive cruise control system, a collision avoidance system, and/or the like. The driver assistance systems may include other systems in addition to, or instead of, any of these systems. In an example embodiment, the one or more mechanical systems 8 may be configured to autonomously drive the vehicle 5, assist in driving the vehicle 5, provide timely warnings to a driver of the vehicle 5, and/or the like. In an example embodiment, the one or more mechanical systems may be controlled, at least in part by the vehicle apparatus 20.

Similarly, as shown in FIG. 2A, the model apparatus 10 may comprise a processor 12, memory 14, a user interface 18, a communications interface 16, and/or other components configured to perform various operations, procedures, functions or the like described herein. Certain example embodiments of the vehicle apparatus 20 and the model apparatus 10 are described in more detail below with respect to FIGS. 2A and 2B. The image capture system 50 may be any system configured to capture image data and provide the image data (e.g., via one or more wired or wireless networks) to the model apparatus 10. In an example embodiment, the image capture system 50 may comprise elements similar to the vehicle apparatus 20. For example, an image capture system 50 may comprise a processor, memory, a user interface, a communications interface, a location sensor, an image capture device, and/or the like. In an example embodiment, an image capture system 50 may be onboard an airplane, a satellite, an aerial vehicle, a ground vehicle, and/or other image capture system conveyance (e.g., may be held in person's hand, and/or the like).

II. Example Operation

In an example embodiment, a geographic database storing map data of a lane-centric road network model is provided. In various embodiments, the lane-centric road network model describes a road network model as a collection of surfaces (e.g., drivable surfaces and non-drivable surfaces). In an example embodiment, the non-drivable surfaces comprise sections of pavement that are not intended to be driven along and/or may not be legal to along. For example, the non-drivable surfaces may comprise parking spaces, gore, shoulder, and/or the like. In an example embodiment, the drivable surfaces comprise lanes and open drivable surfaces. For example, a lane is a travel lane of the road network. In an example embodiment, an open drivable surface is a drivable surface of the road network that corresponds to two or more lanes of the road network. For example, an open drivable surface may be an area of road surface within the road network wherein two or more lanes overlap, at least in part, possibly due to changes in lane level topology. For example, an intersection may be an open drivable surface because two or more lanes cross, share space, and/or the like in the intersection. For example, the thick dashed lines shown in the open drivable surface 320 of FIG. 3A illustrate how two or more lanes may cross, share spaced, and/or the like within an open drivable surface.

In an example embodiment, a geographic database storing map data of a lane-centric road network model is provided. In an example embodiment, the geographic database comprises a plurality of data records. The plurality of data records comprise lane records corresponding to the lanes of the road network, open drivable surface records corresponding to the open drivable surfaces of the road network, and non-drivable surface records corresponding to the non-drivable surfaces of the road network. Each data record comprises inter-surface elements and intra-surface elements, in an example embodiment. In an example embodiment, data records further comprise features corresponding to the corresponding surface. For example, the features may provide semantic information/data for the corresponding drivable surface.

The inter-surface elements comprise boundary elements describing the location of the physical boundaries of the corresponding surface (e.g., non-drivable surface, lane, or open drivable surface). For example a lane record comprises longitudinal and lateral boundary elements. The lateral boundary elements may describe the location of the boundaries of the lane in a direction that does not cross the flow of traffic of the lane. The longitudinal boundary elements may describe the location of the boundaries of the lane in a direction that does cross the flow of traffic of the lane. Open drivable surface records and non-drivable surface records may also comprise boundary elements. However, in various situations, the direction of traffic along an open drivable surface and/or non-drivable surfaces may not be defined. Thus, in an example embodiment, the boundary elements of at least some open drivable surface records and non-drivable surface records are not differentiated into lateral and longitudinal boundary elements. The inter-surface elements may further comprise instances of adjacency information. An instance of adjacency information/data corresponding to a first drivable surface identifies a data record corresponding to a second drivable surface that is physically adjacent to the first drivable surface. For example, the first and second drivable surfaces are adjacent if they share or have a common boundary element. An instance of adjacency information/data comprises crossing parameters indicating when, where, and under what conditions a vehicle may cross the shared boundary separating the first and second drivable surfaces. In an example embodiment, intra-surface elements comprise information/data corresponding to lane geometry, interior lane boundaries, a lane center line, and/or the like.

In an example embodiment, a data record may further comprise one or more features corresponding to the corresponding surface. The one or more features may comprise a lane identifier configured to uniquely identify the lane; a segment identifier configured to uniquely identify the road segment corresponding to the lane (e.g., 500 block of Avenue A, and/or the like); a segment name; an open drivable surface identifier configured to identify the corresponding open drivable surface; an intersection identifier configured to identify the intersection corresponding to the open drivable surface and/or an intersection with which the corresponding drivable surface shares a boundary element (e.g., Avenue A at First Street, and/or the like); a speed limit corresponding to the drivable surface; one or more traffic rules corresponding to the drivable surface; a lane type (e.g., bike lane, left turn lane, right turn lane, thru traffic lane, center turn lane, and/or the like); or one or more current, real time, near real time, and/or the like traffic conditions (e.g., current average speed, lane open/closed, incident report, and/or the like) corresponding to the drivable surface, a non-drivable surface identifier configured to identify the corresponding non-drivable surface, a surface type identifier (e.g., drivable surface, lane, open drivable surface, non-drivable surface, parking surface, and/or the like), and/or the like.

FIGS. 3A and 3B illustrate the difference between an example embodiment of the lane-centric road network model and traditional link and node road network models. As shown in FIG. 3A, the lane-centric road network model representing road network portion 300 includes an open drivable surface 320 and a plurality of lanes 305. The lanes 305 comprise bike lanes 380, left turn lanes 315, and various other lanes 305. The lane-centric road network model representation of road network portion 300 further includes portals 330 illustrating aspects of some of the instances of adjacency information/data corresponding to road network portion 300. In particular, in an example embodiment, the portals 330 indicate how traffic may enter and exit the corresponding lanes via the longitudinal boundaries of the corresponding lane. For example, a driving corridor along a lane may be generated by connecting the center of an entry portal for the lane and the center of an exit portal for the lane. As can be seen by FIG. 3A, the lane-centric road network model representation of the road network portion 300 provides the information/data necessary to perform lane-level driving corridor determination and navigation processes.

In contrast to the lane-centric road network model representation of the road network portion 300, FIG. 3B illustrates a traditional representation of the road network portion 300. The traditional representation of the road network portion 300 comprises a junction area 90 representing the intersection and incoming/outgoing roads 92A, 92B, and 92C. However, the lanes of the incoming and outgoing roads are assumed to be grouped together in a parallel bundle and are assumed to start and end together with the road as a whole. For example, the end and beginning of lanes are represented as a flat cut along a road or a side of the road. As FIG. 3B illustrates, the traditional representation of the road network portion 300 fails to accurately describe the physical drivable surfaces and the lane level topology of the road network portion 300. Thus, the traditional link and node representation fails to provide sufficient information for lane-level driving corridor determination and navigation processes.

Various aspects of the geographic database storing map data of the lane-centric road network model; the generation, updating, and/or managing of the geographic database storing map data of the lane-centric road network model; and the use of the geographic database storing map data of the lane-centric road network model to perform various navigation functions will now be described.

Geographic Database

Various aspects of an exemplary geographic database storing map data of the lane-centric road network model will now be described with respect to FIGS. 3A and 4-9. FIG. 4 illustrates a road network portion 400. FIG. 5 illustrates a representation of the lanes 305 of the road network portion 400 according to the lane records stored by the geographic database. FIG. 6 illustrates a representation of the open drivable surface 320 of the road network portion 400 according to the open drivable surface record stored by the geographic database. FIG. 7 illustrates the representation of drivable surfaces of the road network portion 400 according to the data records stored by the geographic database and one example of how a vehicle 5 may navigate the road network portion 400 based on the data records. FIG. 8 illustrates some inter-surface elements of a road network portion 500. FIG. 9 illustrates some intra-surface elements of the road network portion 500.

In an example embodiment, the map data of the lane-centric road network model may be stored in a geographic database. The geographic database may comprise a plurality of data records that correspond to drivable and non-drivable surfaces of the road network. The plurality of data records comprise lane records corresponding to the lanes of the road network, open drivable surface records corresponding to the open drivable surfaces of the road network, and non-drivable surface records corresponding to the non-drivable surfaces of the road network. Each record may be indexed by a surface identifier. For example, each lane record may be indexed by a lane identifier configured to uniquely identify the lane. Similarly, each open drivable surface record may be indexed by an open drivable surface identifier configured to uniquely identify the open drivable surface and each non-drivable surface record may be indexed by a non-drivable surface identifier configured to uniquely identify the non-drivable surface. In an example embodiment, the lane identifiers, the open drivable surface identifiers, and/or non-drivable surface identifiers may be instances of surface identifiers. For example, surface identifier may uniquely identify a particular drivable or non-drivable surface within the lane-centric road network model. In an example embodiment, a surface identifier may further indicate whether the identified surface is a lane, an open drivable surface, or a non-drivable surface.

The geographic database further comprises a plurality of instances of adjacency information/data. In an example embodiment, the data records comprise instances of adjacency information/data. In an example embodiment, the instances of adjacency information/data are stored independently from the data records and are referenced by the data records. For example, an instance of adjacency information/data links a first surface and a second surface. In an example embodiment, an instance of adjacency information/data is indexed by the surfaces linked by the instance of adjacency information/data. For example, an instance of adjacency information/data is retrievable using a surface, lane, open drivable surface, or non-drivable surface identifier of a surface corresponding to the instance of adjacency information/data. In one example embodiment, the data records comprise the instances of adjacency information/data.

In an example embodiment, a data record comprises inter-surface elements. For example, an open drivable surface record comprises boundary elements 325 describing the physical boundaries of the open drivable surface 320. For example, each boundary element may comprise one or more geographic points (e.g., designated by longitude and latitude and/or the like), a straight or curved line defined by one or more geographic points, and/or the like describing the physical location of the corresponding open drivable surface boundary. Each boundary element may include an indication of whether the boundary element is crossable. For example, the boundary element may be shared by the open drivable surface and an adjacent lane and therefore be crossable in the direction of the flow of traffic of the lane. However, the boundary element may not be crossable in a direction that is not in the direction of the flow of traffic of the adjacent lane. The boundary element may be stored in association with an instance of adjacency information/data that identifies the drivable surface (e.g., lane or open drivable surface) that shares the boundary element and crossing parameters indicating a direction at which the boundary element may be crossed, and under what conditions the boundary element may be crossed. For example, the instance of adjacency information/data corresponding to a first boundary element may comprise a surface, lane, or open drivable surface identifier identifying the surface that shares the first boundary element and one or more crossing parameters. The crossing parameters may indicate that the boundary element may only be crossed at a particular heading (e.g., cardinal direction, angle with respect to a reference line, and/or the like); may be crossed in a first direction (e.g., from a first drivable surface to a second drivable surface), a second direction opposite the first direction (e.g., from the second drivable surface to the first drivable surface), in both the first and second direction (e.g., from the first drivable surface to the second drivable surface or from the second drivable surface to the first drivable surface); that the boundary element is only to be crossed in order to avoid a collision, park the vehicle, and/or the like that the boundary element corresponds to a yield sign, stop sign, stop light, or other traffic signal; and/or the like. In another example, the boundary element may not be crossable. For example, the boundary element may comprise a boundary of the road network (e.g., a curb, median, edge of the roadway) or be adjacent to a non-drivable surface (e.g., a sidewalk, shoulder, gore, and/or the like). Therefore, the associated instance of adjacency information/data may indicate that the boundary element is not crossable or only crossable under very specific and/or extreme circumstances (e.g., avoiding a collision and/or the like).

For example, a lane record comprises longitudinal boundary elements and lateral boundary elements. Each lateral boundary element describes the physical location of a lateral boundary 390 (e.g., 390A, 390B, 390C) of the corresponding lane 305. A lateral boundary of a lane is a boundary that extends in a direction that is generally along or parallel to the flow of traffic of the lane. For example, a lateral boundary of a lane does not cross the flow of traffic of the lane. Each longitudinal boundary element describes the physical location of a longitudinal boundary 335 of the corresponding lane 305. A longitudinal boundary of a lane is a boundary that extends in a direction that is generally across the flow of traffic of the lane. For example, a longitudinal boundary of a lane does cross the flow of traffic of the lane. For example, in an example embodiment, a lane record may comprise two longitudinal boundary elements.

Similar to the boundary elements of the open drivable surface records, the longitudinal and lateral boundary elements of the lane records may each describe the physical location of a corresponding lane boundary and be associated with an instance of adjacency information/data. For example, each longitudinal or lateral boundary element may comprise one or more geographic points (e.g., designated by longitude and latitude and/or the like), a straight or curved line defined by one or more geographic points, and/or the like describing the physical location of the corresponding lane boundary. Each longitudinal or lateral boundary element may include an indication of whether the boundary element is crossable. For example, the boundary element may be shared by the lane and an adjacent lane or an adjacent open drivable surface and therefore be crossable in the direction of the flow of traffic of the lane or in a direction transverse to the flow of traffic of the lane (e.g., changing lanes). For example, the longitudinal or lateral boundary element may be stored in association with an instance of adjacency information/data that identifies the adjacent drivable surface (e.g., lane or open drivable surface) that shares the boundary element and crossing parameters indicating a direction at which the boundary element may be crossed, and under what conditions the boundary element may be crossed. For example, the instance of adjacency information/data corresponding to a first boundary element may comprise a surface, lane, or open drivable surface identifier identifying the adjacent drivable surface that shares the first boundary element and one or more crossing parameters. The crossing parameters may indicate that the boundary element may only be crossed at a particular heading or range of headings (e.g., cardinal direction, angle with respect to a reference line, range of angles, and/or the like); may be crossed in a first direction (e.g., from a first drivable surface to a second drivable surface), a second direction opposite the first direction (e.g., from the second drivable surface to the first drivable surface), in both the first and second direction (e.g., from the first drivable surface to the second drivable surface or from the second drivable surface to the first drivable surface); that the boundary element corresponds to a yield sign, stop sign, stop light, or other traffic signal; and/or the like. In another example, the boundary element may not be crossable. For example, the boundary element may comprise a boundary of the road network (e.g., a curb, median, edge of the roadway) or be adjacent to a non-drivable surface (e.g., a sidewalk, shoulder, gore, and/or the like). In another example, the flow of traffic in the adjacent lane may be in the opposite direction (e.g., a lateral boundary that is shared by a first lane of traffic carrying eastbound traffic and a second lane carrying westbound traffic). Therefore, the associated instance of adjacency information/data may indicate that the boundary element is not crossable.

In an example embodiment, an instance of adjacency information/data corresponding to a longitudinal boundary element is provided as a portal 330. For example, a driving corridor along a lane travels from a lane entry portal to a lane exit portal. The lane exit portal is either an open drivable surface entry portal or a lane entry portal for an adjacent lane. As shown in FIG. 7, a driving corridor through road network portion 400 may be generated by connecting the center points of portals corresponding to the lanes to be traveled. In some instances, more than one exit portal may be associated with a lane or open drivable surface. For example, FIG. 6 shows an open drivable surface entry portal 332 that corresponds to two exit portals 334 (e.g., 334A, 334B). The determination of which exit portal to traverse (and therefore which lane to enter) is determined based on corresponding traffic laws, lane-level traffic conditions, upcoming maneuvers (e.g., upcoming right or left turns, and/or the like), and/or the like. For example, in the instance shown in FIG. 6, the left turn from the open drivable surface entry portal 332 may be made to the lane entry portal 334B so that the turn is a legal turn from a left lane to a left lane, in an example embodiment. Thus, the lane records and open drivable surface records comprise information/data that describe the physical boundaries of the corresponding lanes and open drivable surfaces, the physical adjacency properties of the lanes and open drivable surfaces, and the conditions under which a vehicle 5 may cross a shared boundary between adjacent drivable surfaces.

The data records (e.g., lane records and open drivable surface records) further comprise intra-surface elements. For example, a lane record may comprise information/data describing the geometry of a lane, a width of a lane, a direction of traffic flow along the lane (e.g., an expected heading of a vehicle traveling in the lane at a particular location along the lane, and/or the like), a center line of the lane, and/or the like. In an example embodiment, the intra-surface elements may further comprise internal boundaries of a lane or open drivable surface. In an example embodiment, the internal boundaries may be physical boundaries or virtual boundaries configured to provide a smooth flow of traffic. For example, FIG. 9 shows road network portion 500 wherein a right turn is possible. For example, open drivable surface 320 may have an internal boundary 395 that separates vehicles taking a right turn from lane 305B and vehicles turning right into the open drivable surface 320. The internal boundary 395 may allow for a first vehicle to take the right turn from lane 305B and a second vehicle to make the right turn into the open drivable surface 320 at generally the same time while maintaining a smooth flow of traffic. The internal boundary 395 may be divided into multiple sections. For example, the first section 395A may be an internal boundary that is not to be crossed and the second section 395B may be crossable under various circumstances. Thus, in various embodiments, the inter-surface elements and intra-surface elements of the data records may provide an accurate physical representation of the corresponding drivable surfaces (e.g., lanes and open drivable surfaces).

In an example embodiment, the data records may further comprise one or more features (e.g., semantic features and/or the like). In an example embodiment, the one or more features may be logical features and/or abstractions of the corresponding drivable surfaces. For example, the one or more features may provide semantic information/data to the corresponding lane or open drivable surface. For example, the one or more features may comprise a lane identifier, open drivable surface identifier, or drivable surface identifier configured to uniquely identify the corresponding lane, open drivable surface, and/or drivable surface within the geographic database. In an example embodiment, the one or more features may comprise a segment identifier, a segment name, an intersection identifier, and/or the like that may provide the ability to connect a lane record or open drivable surface record to a link and node road network model. In an example embodiment, the one or more features may comprise a speed limit, one or more traffic rules, or one or more traffic conditions, and/or the like for the corresponding lane or open drivable surface.

In an example embodiment, the geographic database comprising the map data of the lane-centric road network model may be stored in memory such as a non-transitory computer-readable medium. For example, the model apparatus 10 may store the geographic database in memory 14. In another example, the vehicle apparatus 20 may store the geographic database in memory 24. In another example, the geographic database may be stored by a non-transitory computer-readable medium that may be physical transferred between various computing entities (e.g., on a compact disc, thumb/USB drive, SD card, external hard drive, and/or the like).

Generating a Geographic Database

FIG. 10 provides a flowchart illustrating processes and procedures for generating or updating a geographic database in accordance with an example embodiment. Starting at block 102, image data is received. For example, the model apparatus 10 may receive image data from one or more image capturing systems 50, one or more vehicle apparatuses 20, and/or the like. For example, an image capturing system 50 and/or vehicle apparatus 20 may capture image data that includes portions of a road network and provide (e.g., transmit) the image data. The model apparatus 10 may then receive the image data. For example, the model apparatus 10 may comprise means, such as processor 12, memory 14, communications interface 16, and/or the like, for receiving image data. In an example embodiment, the image data may be provided along with geographic location data identifying or that can be used to identify a latitude and longitude corresponding to at least one point or identifiable feature within the image data.

At block 104, lane boundaries are extracted from the image data. For example, the model apparatus 10 may extract lane boundary information/data from the image data. For example, the model apparatus 10 may comprise means, such as processor 12 and/or the like, for extracting boundary information/data from the image data. For example, the image data may be analyzed to identify lane lines, curbs, stop lines, road markings, road edges, and/or the like that delineate and/or mark the lane boundaries of the lanes shown in the image data. For example, a feature detector, lane line detector, trained neural network, and/or the like may be used to identify and extract geo-coded lane boundaries from the image data. For example, the lane boundaries may be extracted as lines and/or sets of points described by latitude and longitude pairs that describe the location of the boundaries of the lanes. In various embodiments, lateral and longitudinal lane boundaries may be extracted based on road markings and other physical boundaries of the lanes (e.g., curbs, concrete barriers, medians, and/or the like). In an example embodiment, the physical boundaries of open drivable surfaces may be similarly extracted from the image data.

At block 106, adjacency information/data and internal lane elements may be identified. For example, the model apparatus 10 may determine adjacency information/data and internal lane elements. For example, the model apparatus 10 may comprise means, such as the processor 12 and/or the like, for determining adjacency information/data and internal lane elements. For example, the adjacency information/data and internal lane elements may be determined based at least in part on the image data. For example, based on the boundaries extracted at block 104, adjacent drivable surfaces may be identified and adjacency information/data may be determined and/or generated. Additionally, based on the image data, for example, lane mapping, lane geometry, lane center lines, and/or the like may be determined.

At block 108, one or more lane records may be generated and/or updated based on the extracted and/or determined boundaries, adjacency information/data, and internal lane elements. For example, the model apparatus 10 may generate one or more lane records and/or update one or more lane records based on the extracted and/or determined boundaries, adjacency information/data, and/or internal lane elements. For example, the model apparatus 10 may comprise means, such as the processor 12, memory 14, and/or the like to generate and/or update one or more lane records based on the extracted and/or determined boundary information/data, adjacency information/data and/or internal lane elements. For example, the boundary information/data may be used to generate and/or update one or more boundary elements of the inter-surface elements of one or more lane records. For example, the adjacency information/data may be used to generate and/or update one or more instances of adjacency information/data and/or portals. For example, the internal lane elements may be used to generate and/or update one or more intra-surface elements of one or more lane records. Various features (e.g., a drivable surface identifier and/or other semantic features) may be generated, determined, and/or the like as part of the lane record.

At block 110, the one or more lane records generated at block 108 may be stored in the geographic database. For example, the model apparatus 10 may store one or more lane records and/or update one or more lane records in the geographic database. For example, the model apparatus 10 may comprise means, such as processor 12, memory 14, and/or the like for storing and/or updating one or more lane records in the geographic database.

At block 112, one or more open drivable surface records may be generated based on open drivable surfaces identified in the image data. For example, drivable surfaces in the image data that correspond to an area of drivable surface wherein two or more lanes overlap at least in part lanes may be identified as open drivable surfaces. For example, the model apparatus 10 may identify one or more open drivable surfaces from the image data; extract boundary information/data, adjacency information/data, and/or intra-surface elements for the identified open drivable surfaces from the image data; associate one or more features with the open drivable surface (e.g., a drivable surface identifier and/or other semantic features) and generate and/or update one or more open drivable surface records.

At block 114, the one or more generated and/or updated open drivable surface records are stored in the geographic database. For example, the model apparatus 10 may store one or more open drivable surface records and/or update one or more open drivable surface records in the geographic database. For example, the model apparatus 10 may comprise means, such as processor 12, memory 14, and/or the like for storing and/or updating one or more open drivable surface records in the geographic database.

At block 118, at least a portion of the geographic database is provided. For example, the model apparatus 10 may provide (e.g., transmit) at least a portion (e.g., at least one map tile) of the geographic database. For example, the model apparatus 10 may comprise means, such as the processor 12, communication interface 16, and/or the like, for providing at least a portion of the geographic database. For example, a vehicle apparatus 20 may receive (e.g., via the communication interface 26) the at least a portion of the geographic database and use the received geographic database to update a locally stored geographic database 34.

Navigating Using a Geographic Database

FIG. 11 provides a flowchart illustrating various procedures and processes for navigating using a geographic database, according to an example embodiment. For example, the vehicle apparatus 20 may use a geographic database 34 to perform one or more navigation tasks such as localization, driving corridor determination, real time or near real time navigation, and/or the like. Starting at block 202, the current location or a start location is determined. For example, the vehicle apparatus 20 may determine the current location of the vehicle 5 and/or the vehicle apparatus 20. In an example embodiment, a user may provide (e.g., via user input) a current location or start location. In an example embodiment, the vehicle apparatus 20 may receive a current location or start location from another computing entity (e.g., via a wired or wireless network). For example, the vehicle apparatus 20 may comprise means, such as processor 12, communication interface 16, user interface 18, location sensor 30, and/or the like for determining a current location or start location for a route.

At block 204, a destination location is determined. For example, the vehicle apparatus 20 may determine the destination location. For example, a user may provide (e.g., via user input) a destination location. In an example embodiment, the vehicle apparatus 20 may receive a destination location from another computing entity (e.g., via a wired or wireless network). For example, the vehicle apparatus 20 may comprise means, such as processor 12, communication interface 16, user interface 18, location sensor 30, and/or the like for determining a destination location for a route.

At block 206, map data is accessed from the geographic database 34. For example, the vehicle apparatus 20 may access map data from the geographic database 34. For example, the vehicle apparatus 20 may comprise means, such as the processor 12, memory 14, geographic database 34, and/or the like, for accessing map data from the geographic database 34. For example, the geographic database 34 may comprise one or more map tiles corresponding to the current or start location, the destination location, and/or various locations located between the start or current location and the destination location, along the way from the start or current location to the destination location, and/or the like. For example, the one or more map tiles may comprise map data comprising one or more lane records and one or more open drivable surface records that are linked via a plurality of instances of adjacency information/data. The one or more map tiles may be accessed such that the lane records and/or the open drivable surface records may be used to perform one or more navigation tasks.

At block 208, a driving corridor is determined from the start or current location to the destination location. For example, the vehicle apparatus 20 may determine a driving corridor from the start or current location to the destination location based on the map data accessed from the geographic database 34. For example, the vehicle apparatus 20 may comprise means, such as the processor 12 and/or the like, to determine a driving corridor from the start or current location to the destination location based on the map data accessed from the geographic database 34. For example, one or more driving corridor determination techniques may be used to determine a fastest route, shortest driving corridor (e.g., in time or distance), a driving corridor with the least amount of money paid in tolls, a driving corridor that avoids highways, a driving corridor that goes by a particular intermediate location, and/or the like based on the map data accessed from the geographic database 34. For example, as shown in FIG. 7, a driving corridor 9 may be determined by connecting the center points of the portals 330. For example, a driving corridor 9 may be determined by connecting a plurality of lanes and/or open drivable surfaces based on the location information/data (e.g., boundary elements) and instances of adjacency information/data stored in association with the corresponding lane and open drivable surface records. In one example embodiment, the vehicle apparatus 20 may request a driving corridor from the model apparatus 10, a Cloud-based computing entity, and/or the like. The model apparatus 10 (or other computing entity) may determine a driving corridor from the start or current location to the destination location based on the geographic database storing the lane-centric road network model map data and provide the driving corridor to the vehicle apparatus 20.

At block 210, the determined driving corridor may be provided to a user. For example, the vehicle apparatus 20 may provide (e.g., display and/or audibly provide) the determined driving corridor to a user. For example, the vehicle apparatus 20 may comprise means, such as the processor 12, user interface 28, and/or the like, for providing (e.g., displaying and/or audibly providing) the determined driving corridor to a user. For example, the user may review the route, drive the vehicle 5 along the route, and/or the like. In an example embodiment, the determined driving corridor may be provided by being displayed overlaid on a map, as a map layer, as a list of turn by turn instructions, a combination thereof, and/or the like. For example, the processor 22 may be configured to cause the user interface 28 to display the driving corridor on a visualization of the one or more lane records and one or more open drivable surface records. For example, the providing of the determined driving corridor may be updated as the location of the vehicle 5 changes as the vehicle 5 traverses the route.

At block 212, the vehicle 5 may autonomously drive and/or assist a human driver to drive along the determined route. For example, the vehicle apparatus 20 may control one or more mechanical systems 8 (e.g., driver assistance systems, safety systems, various engine systems, response and handling systems, suspension systems, and/or the like) to cause the vehicle 5 to travel along the determined driving corridor and/or to assist the vehicle 5 in traveling along the determined route. For example, the map data may comprise lane and/or open drivable surface records that comprise information/data providing current weather and/or traffic conditions along the corresponding lane and/or at the corresponding open drivable surface. In an example embodiment, the current weather and/or traffic conditions for a lane (as provided by the corresponding lane record) may be used to adjust the suspension, safety systems, response and handling systems, suspension system and/or other mechanical systems 8 as the vehicle 5 is driven along the driving corridor (e.g., by a user or autonomously). For example, the mechanical systems 8 may turn on the headlights while a vehicle 5 is traveling along a lane that the corresponding lane record indicates is inside a tunnel. In an example embodiment, the vehicle apparatus 20 may cause one or more mechanical systems 8 of the vehicle 5 to autonomously drive along the determined route.

As should be understood, the vehicle apparatus 20 may use the map data stored in the geographic database 34 to perform a variety of navigation tasks. For example, the vehicle apparatus 20 may perform localization, driving corridor determination, real time or near real time navigation, and/or other navigation tasks based on the map data stored in the geographic database 34.

Advantages

Example embodiments of the geographic database comprising map data of the lane-centric road network model provide various advantages over traditional link and node road network models. For example, example embodiments of the geographic database of the present invention provide a detailed and accurate model of the lanes and open drivable surfaces of a road network. Additionally, example embodiments of the geographic database of the present invention allow for determination of a lane level route. For example, example embodiments of the geographic database of the present invention allow for lane level navigation, lane level determination and navigation of an autonomously driven route, and/or the like. Example embodiments reduce the real time computation of a drivable corridor for autonomous driving of a vehicle with respect to traditional, flat-cut road network models. Therefore, the geographic database of the present invention, and in particular the lane records, open drivable surface records, and the linking thereof via the instances of adjacency information/data provide an improvement to the technical fields of driving corridor determination, assisted navigation, and autonomous navigation.

III. Example Apparatus

The vehicle apparatus 20 and/or model apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or model apparatus 10 may be embodied in other types of computing devices, such as a server, a personal computer, a computer workstation, a laptop computer, a plurality of networked computing devices or the like, that are configured to update one or more map tiles, analyze probe points for driving corridor planning or other purposes. For example, in an example embodiment, the vehicle apparatus 20 is an in vehicle routing and navigation system on board a vehicle 5 and the model apparatus 10 is a map provider system that is remotely located with respect to the vehicle apparatus 20. In an example embodiment, the vehicle apparatus 20 may be configured to control one or more mechanical systems 8 (e.g., driver assistance systems, safety systems, various engine systems, response and handling systems, suspension systems, and/or the like).

In this regard, FIG. 2A depicts a model apparatus 10 and FIG. 2B depicts a vehicle apparatus 20 of an example embodiment that may be embodied by various computing devices including those identified above. As shown, the model apparatus 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GPS sensor; IMU sensors, and/or the like), one or more image capturing devices 32 (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the vehicle apparatus to determine one or more features of the corresponding vehicle's surroundings, and/or other components configured to perform various operations, procedures, functions or the like described herein. In an example embodiment, the vehicle apparatus 20 may further comprise a geographic database 34 storing map data of a lane-centric road network model. For example, the geographic database may comprise a plurality of lane and/or open drivable surface records in one or more digital map tiles. For example, one or more map tiles comprising portions of the geographic database 34 may be provided (e.g., transmitted) to the vehicle apparatus 20 by the model apparatus 10.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the model apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the model apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The model apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the model apparatus 10 and/or vehicle apparatus 20 of an example embodiment, a routing and navigation system may also include or have access to a geographic database that includes a variety of data (e.g., map information/data) utilized in constructing a driving corridor or navigation path and determining the time to traverse the driving corridor or navigation path. For example, the geographic database may comprise map data corresponding to a lane-centric road network model of the present invention. In an example embodiment, the geographic database may further comprise a link and node road network model. For example, a geographic database may include node data records (e.g., including anchor node data records comprising junction identifiers), road segment or link data records, lane records, open drivable surface records, point of interest (POI) data records, and other data records. More, fewer or different data records can be provided. In one embodiment, the other data records include cartographic ("cartel") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded driving corridor information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the vehicle apparatus 20 may be configured to execute computer-executable instructions provided by and/or referred to by a data record. In an example embodiment, the model apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated driving corridor or recorded driving corridor information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses 20.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as driving corridor calculation, driving corridor guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a routing and navigation system that embodies a vehicle apparatus 20 in accordance with an example embodiment may determine the time to traverse a driving corridor that includes one or more turns at respective intersections more accurately.

IV. Apparatus, Methods, and Computer Program Products

As described above, FIGS. 10 and 11 illustrate flowcharts of apparatuses 10, 20, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
   at least one memory, the at least one memory storing a geographic database storing map data, the geographic database comprising:
   a plurality of data records corresponding to drivable surfaces of a road network, the plurality of data records comprising:
   a plurality of lane records, wherein each lane record corresponds to a drivable surface of a particular lane of the road network, and
   a plurality of open drivable surface records, wherein each open drivable surface record corresponds to a drivable surface of a particular open drivable surface of the road network, wherein the particular open drivable surface is a portion of a surface of the road network where two or more driving lanes are at least partially overlapping and where a direction of traffic is undefined;

wherein a first data record of the plurality of data records comprises a plurality of instances of adjacency information, each instance of adjacency information (a) associates the first data record corresponding to a first surface of the road network with a second data record of the plurality of data records corresponding to a second surface of the road network, wherein the first surface is adjacent to the second surface and (b) indicates crossing parameters between the first surface and the second surface; and at least one processor, the processor configured to:
    determine a start location and a destination location; and
    determine a driving corridor from the start location to the destination location by linking one or more lane records of the plurality of lane records and one or more open drivable surface records of the plurality of open drivable surface records based on the corresponding instances of adjacency information of the plurality of instances of adjacency information.

2. The apparatus of claim 1 further comprising a user interface, the processor further configured to cause the user interface to display the driving corridor on a visualization of the one or more lane records and one or more open drivable surface records.

3. The apparatus of claim 1, wherein the processor is further configured to control one or more mechanical systems of a vehicle to cause the vehicle to traverse at least a portion of the route.

4. The apparatus of claim 1 further comprising a user interface, the processor further configured to cause the user interface to provide an alert based on traffic information corresponding to at least one of the one or more lane records or one or more open drivable surface records.

5. The apparatus of claim 1, wherein each lane record comprises one or more lateral boundary elements and one or more longitudinal boundary elements, a lateral boundary element not crossing a flow of traffic along a corresponding lane of the road network and a longitudinal boundary element crossing the flow of traffic along the corresponding lane.

6. The apparatus of claim 1, wherein the plurality of data records comprises one or more non-drivable surface records, each non-drivable surface record corresponds to a non-drivable surface of the road network, the non-drivable surface being a surface of the road network not intended for driving on.

7. The apparatus of claim 6, wherein the crossing parameters indicate whether the shared boundary element is not crossable, crossable in a first direction, crossable in a second direction that is opposite the first direction, or crossable in both the first direction and the second direction.

8. The apparatus of claim 5, wherein (a) a first lateral boundary element of the one or more lateral boundary elements identifies a physical location of a lateral boundary of the corresponding lane and (b) a first longitudinal boundary element of the one or more longitudinal boundary elements identifies a physical location of a longitudinal boundary of the corresponding lane.

9. The apparatus of claim 1, wherein the first data record comprises one or more features corresponding to the first surface.

10. The apparatus of claim 9, wherein the one or more features comprises at least one of a lane identifier, a segment identifier, a segment name, an open drivable surface identifier, an intersection identifier, a speed limit, one or more traffic rules, or one or more traffic conditions corresponding to the first drivable surface.

11. The apparatus of claim 1, wherein a first lane record of the plurality of lane records comprises at least one of lane geometry information, a lane center line, or interior lane boundaries.

12. A non-transitory computer readable medium having stored therein a geographic database storing map data, the geographic database comprising:
    a plurality of data records corresponding to drivable surfaces of a road network, the plurality of data records comprising:
        a plurality of lane records, wherein each lane record corresponds to a drivable surface of a particular lane of the road network, and
        a plurality of open drivable surface records, wherein each open drivable surface record corresponds to a drivable surface of a particular open drivable surface of the road network, wherein the particular open drivable surface is a portion of a surface of the road network where two or more driving lanes are at least partially overlapping and where a direction of traffic is undefined;
    wherein each first data record of the plurality of data records comprises a plurality of instances of adjacency information, each instance of adjacency information (a) associates the first data record corresponding to a first surface of the road network with a second data record of the plurality of data records corresponding to a second surface of the road network, wherein the first surface is adjacent to the second surface and (b) indicates crossing parameters between the first surface and the second surface,
    wherein the geographic database is configured for use, by an apparatus comprising a processor, for determining a driving corridor from a start location to a destination location by linking one or more lane records of the plurality of lane records and one or more open drivable surface records of the plurality of open drivable surface records based on the corresponding instances of adjacency information of the plurality of instances of adjacency information.

13. The geographic database of claim 12, wherein each lane record comprises one or more lateral boundary elements and one or more longitudinal boundary elements, a lateral boundary element not crossing a flow of traffic along a corresponding lane of the road network and a longitudinal boundary element crossing the flow of traffic along the corresponding lane.

14. The geographic database of claim 12, wherein the plurality of data records comprises one or more non-drivable surface records, each non-drivable surface record corresponds to a non-drivable surface of the road network, the non-drivable surface being a surface of the road network not intended for driving on.

15. The geographic database of claim 14, wherein the crossing parameters indicate whether the shared boundary element is not crossable, crossable in a first direction, crossable in a second direction that is opposite the first direction, or crossable in both the first direction and the second direction.

16. The geographic database of claim 13, wherein (a) a first lateral boundary element of the one or more boundary elements identifies a physical location of a lateral boundary of the corresponding lane and (b) a first longitudinal boundary element of the one or more longitudinal boundary elements identifies a physical location of a longitudinal boundary of the corresponding lane.

17. The geographic database of claim 13, wherein a first lane record of the plurality of lane records indicates that a lateral boundary is not shared with any other drivable surface of the road network, the first lane record indicates that the lateral boundary is not crossable.

18. The geographic database of claim 12, wherein the first data record comprises one or more features corresponding to the first drivable surface.

19. The geographic database of claim 18, wherein the one or more features comprises at least one of a lane identifier, a segment identifier, a segment name, an open drivable surface identifier, an intersection identifier, a speed limit, one or more traffic rules, or one or more traffic conditions corresponding to the first drivable surface.

20. The geographic database of claim 12, wherein a first lane record of the plurality of lane records comprises at least one of lane geometry information, a lane center line, or interior lane boundaries.

\* \* \* \* \*